United States Patent
Mossler et al.

(10) Patent No.: US 12,511,639 B2
(45) Date of Patent: Dec. 30, 2025

(54) SYSTEMS AND METHODS FOR PROVIDING ONLINE AND HYBRIDCARD INTERACTIONS

(71) Applicant: Capital One Services, LLC, McLean, VA (US)

(72) Inventors: Lara Mossler, Farmville, VA (US); Evan Lerner, Midlothian, VA (US); Aravindhan Manivannan, Henrico, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/839,740

(22) Filed: Jun. 14, 2022

(65) Prior Publication Data

US 2022/0309488 A1    Sep. 29, 2022

Related U.S. Application Data

(63) Continuation of application No. 16/503,285, filed on Jul. 3, 2019, now Pat. No. 11,392,933.

(51) Int. Cl.
  *G06Q 20/34* (2012.01)
  *G06Q 20/32* (2012.01)
  (Continued)

(52) U.S. Cl.
  CPC ....... *G06Q 20/353* (2013.01); *G06Q 20/3278* (2013.01); *G06Q 20/352* (2013.01);
  (Continued)

(58) Field of Classification Search
  CPC ............. G06Q 20/353; G06Q 20/3278; G06Q 20/352; G06Q 20/3829; G06Q 2220/00;
  (Continued)

(56) References Cited

U.S. PATENT DOCUMENTS

| | | | |
|---|---|---|---|
| 2002/0043566 A1* | 4/2002 | Goodman | G07F 7/0866 705/65 |
| 2006/0012473 A1* | 1/2006 | Bishop | G06Q 20/20 340/539.1 |

(Continued)

FOREIGN PATENT DOCUMENTS

| | | |
|---|---|---|
| CN | 105612543 A | 5/2016 |
| CN | 109804376 A | 5/2019 |

(Continued)

OTHER PUBLICATIONS

EMV Integrated Circuit Card Specifications for Payment Systems, Nov. 2011, Version 4.3 (Year: 2011).*

*Primary Examiner* — Duan Zhang
(74) *Attorney, Agent, or Firm* — KDW Firm PLLC

(57) ABSTRACT

Various embodiments are generally directed to authenticating a user for non-payment purposes utilizing a payment protocol, a computer device and a contactless card. The payment protocol may be consistent with an EMV standard. An application may determine that authorization or verification of a user may be required to access non-payment features of another application associated with the user and the computer device. The application may then receive and/or facilitate transmission of encrypted data from a communications interface of a contactless card associated with an account and utilizing either an offline or online technique to do so. The offline or online technique may involve one or more operations that can verify the identity of the user and/or otherwise authorize the user to have access to various aspects of the other application.

14 Claims, 10 Drawing Sheets

(51) Int. Cl.
*G06Q 20/38* (2012.01)
*H04L 9/08* (2006.01)
*H04L 9/30* (2006.01)
*H04L 9/32* (2006.01)
*H04W 12/033* (2021.01)
*H04W 12/06* (2021.01)

(52) U.S. Cl.
CPC ....... *G06Q 20/3829* (2013.01); *H04L 9/0877* (2013.01); *H04L 9/3073* (2013.01); *H04L 9/3234* (2013.01); *H04L 9/3247* (2013.01); *H04W 12/033* (2021.01); *H04W 12/06* (2013.01); *G06Q 2220/00* (2013.01)

(58) Field of Classification Search
CPC ............. G06Q 20/343; G06Q 20/3823; G06Q 20/409; G06Q 20/3223; H04L 9/0877; H04L 9/3073; H04L 9/3234; H04L 9/3247; H04W 12/033; H04W 12/06; G06K 7/10297
See application file for complete search history.

(56) References Cited

U.S. PATENT DOCUMENTS

| | | | |
|---|---|---|---|
| 2010/0308109 A1* | 12/2010 | Maddocks | G07F 7/1025 |
| | | | 711/E12.001 |
| 2014/0040147 A1* | 2/2014 | Varadarajan | G06Q 20/4016 |
| | | | 713/168 |
| 2016/0307186 A1 | 10/2016 | Noë et al. | |
| 2021/0166217 A1* | 6/2021 | Lu | G06Q 20/4012 |

FOREIGN PATENT DOCUMENTS

| | | | | |
|---|---|---|---|---|
| JP | 2001519943 A | 10/2001 | | |
| JP | 2001352324 A | 12/2001 | | |
| JP | 2002517869 A | 6/2002 | | |
| JP | 2009140275 A | 6/2009 | | |
| JP | 2018522353 A | 8/2018 | | |
| JP | 2019049926 A | 3/2019 | | |
| KR | 20170001212 A | 1/2017 | | |
| WO | 9844464 A1 | 10/1998 | | |
| WO | WO-9964995 A1 * | 12/1999 | ............. | G06Q 20/00 |

\* cited by examiner

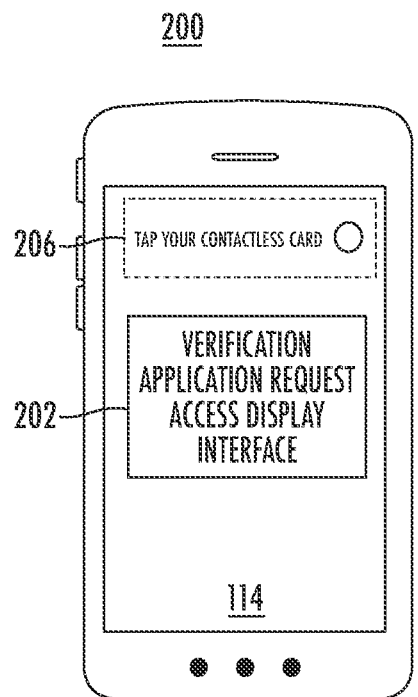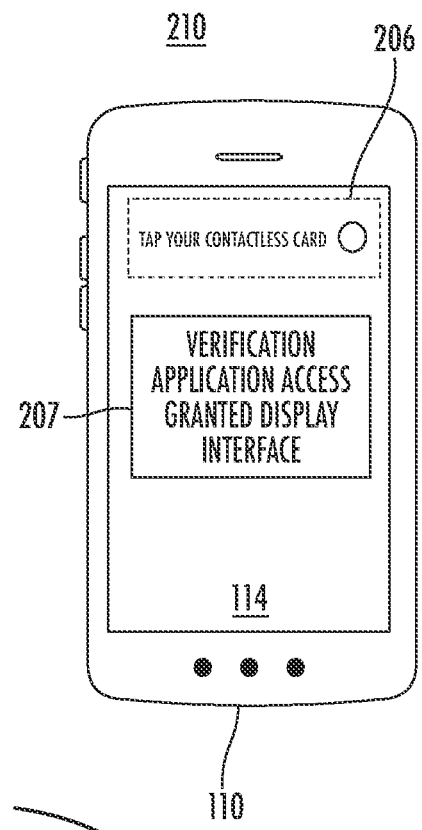
FIG. 2A  FIG. 2B

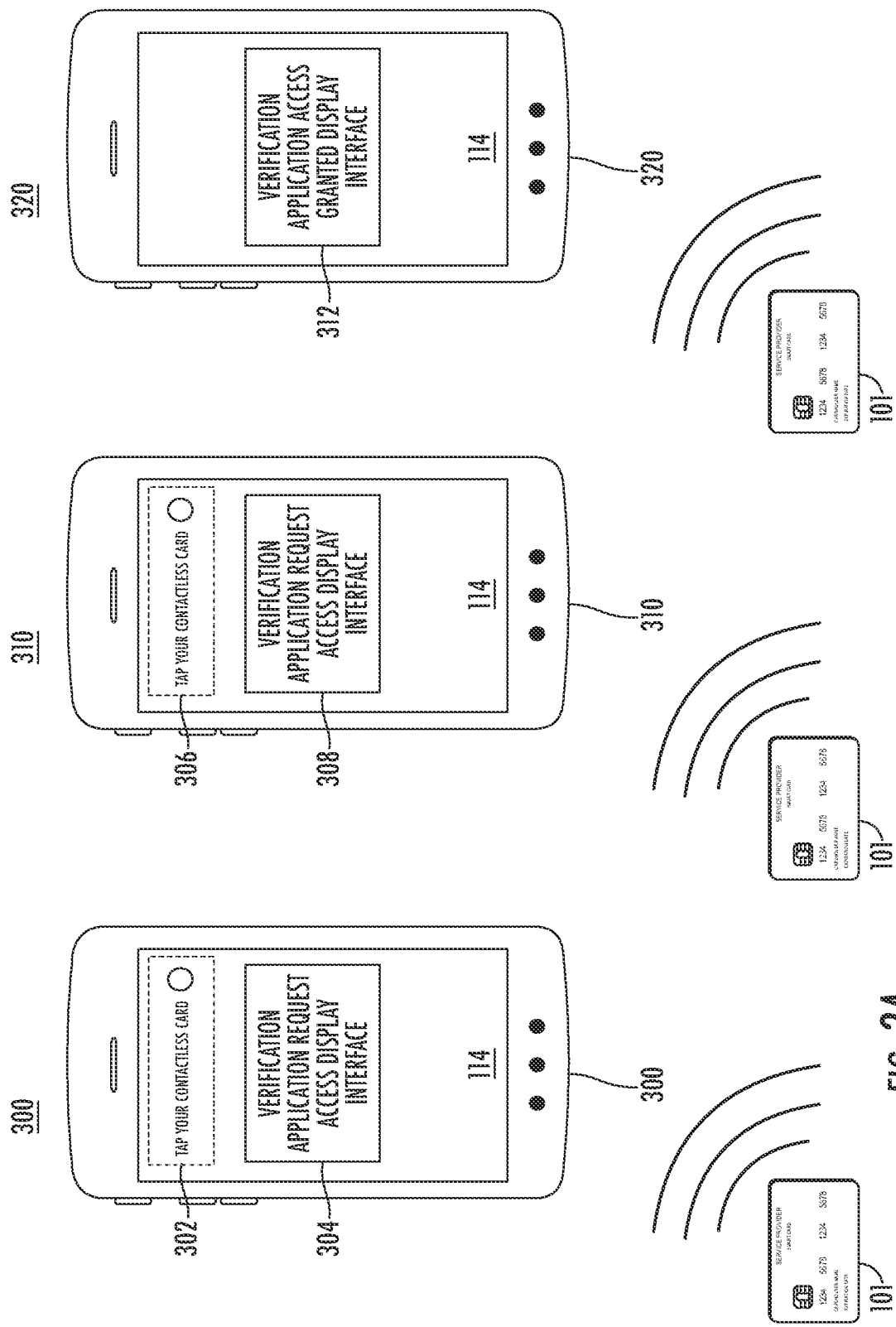

SYSTEMS AND METHODS FOR PROVIDING ONLINE AND HYBRIDCARD INTERACTIONS

CROSS-REFERENCE TO RELATED APPLICATIONS

This application is a continuation of U.S. patent application Ser. No. 16/503,285, entitled "SYSTEMS AND METHODS FOR PROVIDING ONLINE AND HYBRIDCARD INTERACTIONS" filed on Jul. 3, 2019. The contents of the aforementioned application are incorporated herein by reference in their entirety.

STATEMENT OF INCORPORATION BY REFERENCE

The present application is related to application Ser. No. 16/135,954 entitled "Systems and Methods For Providing Card Interactions" filed on Sep. 19, 2018, the entirety of which is incorporated herein by reference.

TECHNICAL FIELD

Embodiments herein generally relate to computing platforms, and more specifically, to authenticating a user based on an authenticated communication between a contactless transaction card and a user device.

BACKGROUND

Activating many cards, and more specifically financial cards (e.g., credit cards), involve the time-consuming process of cardholders calling a telephone number or visiting a website and entering or otherwise providing card information. Further, while the growing use of chip-based financial cards provides more secure features over the previous technology (e.g., magnetic strip cards) for in-person purchases, account access still typically relies on log-in credentials (e.g., username and password) to confirm a cardholder's identity. However, if the log-in credentials are compromised, another person could have access to the user's account.

Accordingly, there is a need for both an improved method of activating a card and an improved authentication for account access.

SUMMARY

Embodiments disclosed herein provide systems, methods, articles of manufacture, and computer-readable media for authenticating a user utilizing a payment protocol for purposes distinct from making a payment. According to one example, an application executing on a computer system may initiate a communication to verify an identity of a user or verify a card with a third-party device. The application executed on the system, as part of the communication, may utilize near field communication (NFC), with a card associated with the user. (In various embodiments, the application may be launched by tapping the contactless card on a user device, e.g. a mobile device). The communication may include receiving a plurality of inputs by the application, including an application transaction counter (ATC) and generating a cryptogram based on the plurality of inputs and a symmetric key associated with the contactless card. The application may then transmit the cryptogram and the ATC to the issuer, and the issuer may provide a response verifying the identity of the user based on the transmitted cryptogram, where the received response is based on a communication that involves recreation of the symmetric key and/or the cryptogram as a whole, where the generation of the cryptogram and the received response is based on a payment protocol, and where the verification of the user identity or card verification is distinct from completing a payment in relation to the payment protocol. In various embodiments, the verification process, and any or all of the operations associated therewith, may be initiated by tapping the contactless card on the user device, e.g. a mobile device of the user.

According to another example, a hybrid technique utilizing both offline and online authentication may be employed to authenticate a user. A system or apparatus with a memory to store instructions and a processor circuit capable of executing the instructions may employ one or more hybrid verification techniques, including an offline and online combination. The execution of the instructions may cause the processor circuitry to perform one or more operations. The operations may include receiving, from an application associated with a user device, a user credential, e.g. a password and username, that is associated with a user profile. (In various embodiments, the application may be launched by tapping the contactless card on a user device, e.g. a mobile device). Another operation may include comparing the received user credential to a second (stored) user credential, e.g. stored versions of the password/username combination. (In various embodiments, the first comparison may also be initiated by a tapping of the contactless card on a user device, e.g. a mobile device). If a match is found, and in response thereto, another operation may include performing i) a plurality of host-less verification operations and ii) a plurality of issuer verification operations. The host-less operations may include: a) communicating, by the application and using near field communication (NFC), with a contactless card, where the contactless card may be associated with the user account and cardholder information, b) receiving, by the application and from the card, a public key of a key pair of the card and cardholder identification information of an account holder of the card, c) instructing, by the application, generation of a digital signature by the card using a private key of the key pair of the card, d) receiving the digital signature from the card, and f) verifying the digital signature using the public key. In various embodiments, the offline verification techniques may take place before or after a series of online verification operations initiated or performed as a result of execution of the instructions by the process. The online verification operations may include: a) providing, by the application and from the card, the computer device with a plurality of inputs, including an application transaction counter (ATC), b) generating, by the application and from the card, a cryptogram based on the plurality of inputs and a symmetric key associated with the card, c) transmitting, by the application, the cryptogram and the ATC to an issuer, and d) receiving a response from the issuer verifying the identity of the user based on the transmitted cryptogram, where the received response is based on a communication that involves recreation of the symmetric key and/or the cryptogram as a whole by the issuer in response to receiving the cryptogram. In various embodiments, the online verification operations may be initiated only after successfully comparing for a second match between at least a portion of the user identity with at least a portion of the cardholder identification information, (where the second comparison may also be initiated by a tap of the contactless card on the user device, and where the total communication may involve more than a single tap of the contactless card on the user device).

According to yet another example, a host system, e.g. a host of an issuer, is provided for, where the host system can enable verification of a user for a non-payment event utilizing a payment protocol. The host system may include a non-transitory computer-readable storage medium storing computer-readable program code executable by a processor to: receive a communication data associated with a user identity verification communication initiated by i) an application associated with the user and the card and ii) at least one computer device computer, the communication data including i) an application transaction counter (ATC) and ii) a cryptogram based on a plurality of inputs of the communication and a symmetric key associated with the card, and transmit a response from the issuer verifying the identity of the user based on the received cryptogram, where the transmitted response is based on a communication that involves recreation of the symmetric key and/or the cryptogram as a whole, where the cryptogram and the transmitted response from the issuer are based on a payment protocol, and where the user identity verification and/or card verification is distinct from completing a payment in relation to the payment protocol.

BRIEF DESCRIPTION OF THE DRAWINGS

FIGS. 2A-2B illustrate embodiments of tapping to verify a contactless card utilizing a payment protocol.

FIGS. 3A-3C illustrate embodiments of tapping to verify a contactless card utilizing a payment protocol.

DETAILED DESCRIPTION

Figure 1:
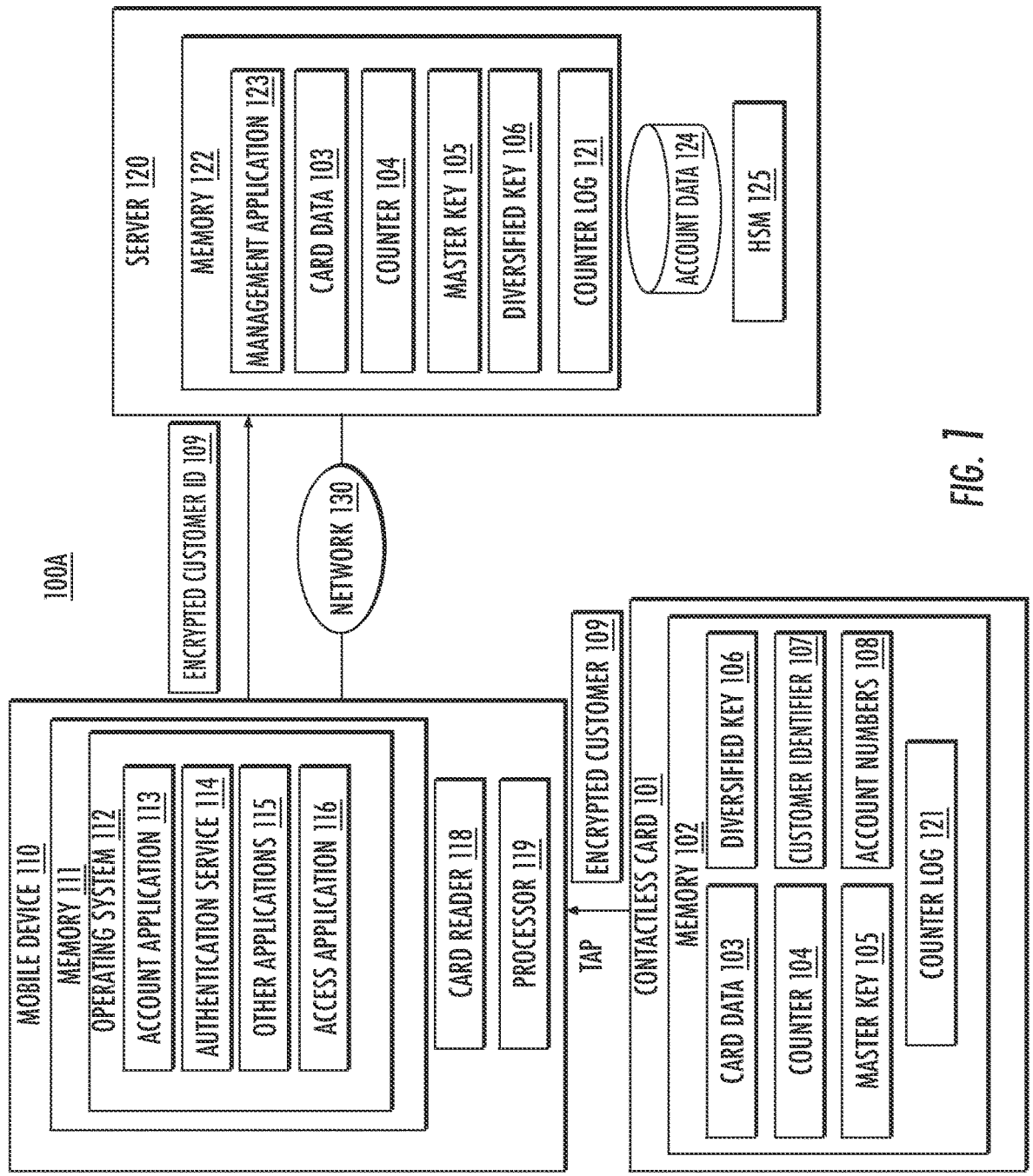
FIG. 1 illustrates an embodiment of a system for verifying or authenticating a contactless card according to a payment protocol.

Aspects of the present disclosure include systems, methods, and/or techniques for providing authenticated cardholder access. Generally, various embodiments relate to i) an online and/or ii) hybrid online and offline protocol that mimics an authentication protocol between a contactless transaction card and a point-of-sale device, except in one or more embodiments of the present disclosure, the authentication protocol is not used to complete a payment event and may or may not utilize real-time online connectivity to an issuer, e.g. authentication server of an issuer, of the transaction card to facilitate a transaction in relation to the authentication protocol. Consistent with the disclosed embodiments, the systems and methods may utilize one or more computing devices, processors, web servers, account servers, and/or contactless devices (e.g., radio frequency identification (RFID) cards).

Various embodiments of the present disclosure provide one or more benefits in terms of verifying a contactless card, and in various embodiments as a result of the verification, a user associated with the contactless card, including taking advantage of enhanced security offered by dynamic authentication techniques, e.g. online and/or online and offline hybrid techniques, associated with payment protocols, but for purposes distinct than making or completing a payment. In various embodiments, utilizing the online technique and/or the online and offline hybrid enhances the efficiency of a computer device, e.g. a mobile phone, by providing a single method for authenticating or verifying a contactless card, and in various embodiments, by extension therewith, a user across one or more applications, even if a payment is not associated with the application, and/or even if the one or more applications are distinct in their purpose, e.g. a transportation application in relation to an entertainment application. Moreover, since one or more payment protocols may have enhanced security given the nature of the authentication associated therewith, e.g. EMV standards are maintained with high security as an objective to avoid theft of funds, the security benefits transfer to other contexts and applications. Accordingly, in various embodiments, a payment authorization protocol can be used to efficiently and more securely authenticate a contactless card, and by extension and pursuant to various embodiments associated therewith, a user associated therewith and across different applications and purposes, including wireless communications, transactions and/or operations that do not involve making a payment.

Moreover, as opposed to purely offline methods, an online or hybrid method permits proper synchronization between a counter, such as an application counter (ATC), utilized by the contactless card and that of the issuer, which can prevent errors during a verification process when a multitude of offline events have taken place without the issuer side (e.g. server) being notified and updated accordingly. Moreover, various embodiments that utilize a combination of offline and online techniques (e.g. hybrid techniques) provide an additional advantage in that, in the event of a network outage, or when additional security is needed, an appropriate vehicle for authentication is available. Additionally, various embodiments provide for partial access via authentication by an online technique and full access once offline verification takes place (or vice versa), which provides further flexibility where some applications (such as banking applications that provide access to financial accounts) have a first-level of information with a certain level of sensitivity (e.g. name, address, etc.) and a second-level of information with a higher level of sensitivity (account balances, pin information, passcode or passphrase information, etc.). Accordingly, various embodiments provide for the ability to ensure proper security for access to one or more aspects of an application or applications, and/or, additionally, providing for appropriate synchronization of counter information.

FIG. 1 depicts a schematic of an exemplary system 100, consistent with disclosed embodiments. As shown, the system 100 includes one or more contactless cards 101, one or more mobile devices 110, and a server 120. The contactless cards 101 are representative of any type of payment card, such as a credit card, debit card, ATM card, gift card, and the like. In various embodiments, the contactless card 101 or card 101 is a virtual payment card. The contactless card 101 may comprise one or more chips (not depicted), such as a radio frequency identification (RFID) chip, configured to communicate with the mobile devices 110 via NFC, the EMV standard, or other short-range protocols in wireless communication. Although NFC is used as an example communications protocol, the disclosure is equally applicable to other types of wireless communications, such as other suitable communication protocols pursuant to the EMV standard, Bluetooth, and/or Wi-Fi. The mobile devices 110 are representative of any type of network-enabled computing devices, such as smartphones, tablet computers, wearable devices, laptops, portable gaming devices, and the like. The server 120 is representative of any type of computing device, such as a server, workstation, computer cluster, cloud computing platform, virtualized computing system, and the like.

As shown, a memory 102 of the contactless card includes card data 103, a counter 104, a master key 105, a diversified key 106, a unique customer identifier 107, and a data store of account numbers 108. The card data 103 generally includes account-related information, such as information used to process a payment using the contactless card 101. For example, the card data 103 may comprise an account number, an expiration date, a billing address, and a card verification value (CVV). The account number may be any type of account number, such as a primary account number (PAN), a virtual account number, and/or a token generated based on the PAN. Other types of account numbers are contemplated, and the use of the account number or other types of card data 103 should not be considered limiting of the disclosure. The card data 103 may further include names, billing address, shipping address, and other account-related information. The account numbers 108 store one-time-use virtual account numbers with associated expiration dates and CVV values. For example, the account numbers 108 may include thousands single-use virtual account numbers, expiration dates, and CVV values.

As shown, a memory 111 of the mobile device 110 includes an instance of an operating system (OS) 112 and a processor 119 may execute one or more operations associated with the applications of the operating system (OS) 112 and/or perform any other suitable operation associated with processor activity, including comparison operations and executing instructions associated with memory 111. Example operating systems 112 include the Android® OS, iOS®, Linux®, and Windows® operating systems. As shown, the OS 112 includes one or more applications, including an account application 113, an authentication or verification application or service 114 (hereinafter referred to as "authentication application" for convenience), one or more other applications 115, and/or one or more access applications 116. The account application 113 allows users to perform various account-related operations, such as viewing account balances, purchasing items, and processing payments. Initially, a user may authenticate using authentication credentials to access the account application 113. For example, the authentication credentials may include a username and password, biometric credentials, and the like.

The authentication application 114 is generally configured to determine when a contactless card and/or a user associated with a contactless card requires authentication for a transaction, service, event or accessibility request, including for purposes distinct from a payment event, wireless communication, service, or request For example, the authentication application 114 may determine that a user requires access to a particular application that is distinct from a payment request, such as access application 116. In various embodiments, the access application 116 can be associated with a contactless card associated with the user. Access application 116 may be or may include an application configured to grant access to a particular service associated with a user account, such as a transportation service (e.g. public transit), health insurance account, a financial account or financial application that contains account balances, brokerage information, or any other suitable financial data, a service application (retail services, delivery services, entertainment services, gaming services, etc.), and any other suitable application that may require user and/or contactless card authentication. In various embodiments, access application 116 is associated with a first-level user account options of a user account, where the first-level user account options may include a display of an account balance, a display of recent transactions, and/or the like. In various embodiments, the access application 116 may be associated with a payment feature, e.g. a credit or bank account for making or receiving payment, but the authentication communication may still implicate a non-payment feature for authentication or verification, e.g. credit or debit card activation. In various embodiments, the authentication application 114 may facilitate the authentication protocol utilizing a separate API interface and call for access to access applications 116. The authentication application 114 may be configured to verify a contactless card and/or user associated with a contactless card by utilizing any suitable payment protocol, including one or more of any verification process utilizing cryptographic techniques, e.g. a standard or authentication protocol compliant with an EMV standard. In various embodiments, the authentication application 114 is configured to synchronize a counter 104 associated with a contactless card 101 and a server 120 associated with an issuer, e.g. authentication server of an issuer, that can communicate with the contactless card 101 and the mobile device when an authentication of the contactless card 101 and/or a user associated with the contactless card 101 takes place.

In various embodiments, the authentication application 114 may coordinate with the server 120 and/or the contactless card 101 to log an authorization for a non-payment communication (e.g. communication) in relation to the counter. The log may be a counter log 121 located in a memory 122 of the server 120 or a memory 102 of the contactless card 101. The log may keep a separate tally of events that are payment events and/or communications and non-payment events and/or communications, irrespective of the total tally of the counter 104, and the server 120 or the contactless card 101. The server 120 and/or the authentication application 114 communicating with the contactless card may utilize the information contained therein for an anti-fraud measure. For example, the authentication application 114 and/or the server 120 may decline a payment event and/or communication if a threshold number of non-payment events and/or communications is too small (or too large) in between the non-payment events and/or communications and the payment events and/or communication or vice versa. In various embodiments, the counter log 121 containing distinguishing information, e.g. counts, between non-payment and payment communications and/or transactions may be used for any other suitable purposes during an online or offline verification protocol.

In various embodiments, the authentication application 114 is associated with the account application 113. For example, the authentication application 114 may be installed on the mobile device 110 with the account application 113, and the user is prompted to enable the authentication application 114 subsequent to the installation. More generally, each time the account application 113 is opened, the account application 113 may determine whether the authentication application 114 is enabled as the default authentication application for the OS 112. If the authentication application 114 is not enabled as the default authentication application, the account application 113 may prompt the user to enable the authentication application 114 as the default authentication application for the OS 112 and/or to enable one or more functionalities of the authentication application 114. Once enabled as the default authentication application for the OS 112, the authentication application 114 may programmatically identify when authorization applications require authentication and may utilize a payment protocol to enable the verification, even if a payment is not associated with the verification or authorization. In various embodiments, in order to initiate an authentication or verification protocol (e.g. at least one operation associated with an online or offline verification technique or protocol), the authentication application 114 may prompt the user to tap a contactless card 101 to the mobile device 110 to initiate the authentication application 114 or one or more operations associated therewith.

Generally, in various embodiment described herein, an online verification or authentication protocol may include one or more of the following operations: the authentication application may initiate a communication, e.g. wireless communication, to verify a contactless card and/or an identity of a user associated with the contactless card, where the authentication application may initiate the application in whole or in part, e.g. access application 116, by prompting the user to tap a contactless card 101 on a computer device, e.g. mobile device 110. The communication may involve an NFC communication between a card reader 118 and a contactless card 101, where the contactless card 101 may provide the mobile device 110 with one or more inputs, including a latest version of an application transaction counter (ATC), and the contactless card 101 or the mobile device 110 (including any suitable components associated therewith) may generate a suitable cryptogram based on the plurality of inputs, and then the contactless card 101 or the mobile device 110 (including any suitable components associated therewith) may transmit the cryptogram and the ATC to an issuer of the contactless card 101 (e.g. a server 120 associated with the issuer). The contactless card 101 and/or the user may then be verified and receive access to one or more features associated with application 116 by receiving a response from the issuer, e.g. authentication server of the issuer, verifying or authorizing the contactless card (and by extension the user associated therewith), where the received response is based at least one cryptographic operations performed by the issuer (e.g. server 120) in response to receiving the cryptogram, and where the generation of the cryptogram and the received response from the issuer, e.g. authentication server of the issuer, is based on a payment protocol, and where the communication and verification of the contactless card and/or user identity of the user is distinct from completing a payment in relation to the payment protocol. As described herein, the protocol may be initiated by one or more taps of the contactless card 101 on the mobile device 110.

Generally, in various embodiment described herein, an offline verification or authentication protocol may include one or more of the following operations: the verification application 114, in order to provide access to one or more features of access application 116 to a user, may initiate an NFC communication between the mobile device 110 and the contactless card 101, and receive one or more inputs from the contactless card 101, where the communication may utilize a card reader 118. The verification application 114 may facilitate receipt of a public key of a key pair from the contactless card 101 and cardholder identification information of an account holder (e.g. user) of the card. An application or component associated with the contactless card 101 and/or the verification application 114 may instruct a component of the card 101 to generate a digital signature by using a private key of the key pair of the card, and the mobile device 110 may receive the digital signature from the card 101 and verify the signature using the public key. As described herein, the protocol may be initiated by one or more taps of the contactless card 101 on the mobile device 110.

In various embodiments, a hybrid protocol may be utilized involving one or more operations of the online and offline protocol, where the online protocol may be initiated by a first or second tap of the contactless card 101 on the mobile device 110 and/or a first or second user credential comparison, and the offline protocol may be initiated by a first or second tap of the mobile device 110 on the contactless card 101 and/or a first or second user credential comparison, where the combination of offline and online protocols may be part of a single verification or authentication or where each may be associated with a partial verification or authentication.

In various embodiments, where the contactless card 101 is a virtual payment card, the authentication application 114 may retrieve information associated with the contactless card 101 by accessing a digital wallet implemented on the mobile device 110, where the digital wallet includes the virtual payment card.

As shown, the server 120 further includes a data store of account data 124 and a memory 122. The account data 124 includes account-related data for a plurality of users and/or accounts. The account data 124 may include at least a master key 105, counter 104, such as an application transaction counter ("ATC") 104 a customer ID 107, an associated contactless card 101, account holder name, account billing address, one or more shipping addresses, one or more virtual card numbers, and biographical information for each account. The memory 122 includes a management application 123 and instances of the card data 103, the counter 104, master key 105, and diversified key 106 for one or more accounts from the account data 124.

The system 100 is configured to implement key diversification to secure data, which may be referred to as a key diversification technique herein. The system 100 may implement an online authentication protocol or a hybrid online and offline authentication protocol. Both the online authentication protocol and hybrid offline and online authentication protocol may utilize one or more operations of the server 120.

In various embodiments, the authentication application 114 receives, from a user, a first application user credential associated with a user profile. The first application user credential may include biometrics data, an established gesture associated with user recognition, a username and password combination, and/or the like. The processor 119 compares the first application user credential with a stored second application user credential. The stored second application user credential may be associated with the user identity and it may be stored either in the memory 111 of mobile device 110 or in the memory 122 of the server 120. In various embodiments, the stored second application user credential is maintained on the server 120 and the first match is performed by the server 120. In various embodiments, upon determining a first match between the first application user credential and the stored second application user credential, the authentication application may grant the user access to one or more first-level user account options of a user account. The user account may be a financial account, a health insurance account, and/or any other account of the like associated with any service provider (e.g., a transit account, an entertainment account, etc.). Once the first match is determined, the user may access certain first-level user account options. The first-level user account options of a user account may include a display of an account balance, a display of recent transactions, events and/or the like. For greater access and/or executing certain account functions, i.e., second-level user account options, second-factor authentication may be required. The second-level user account options may include a personal identification number (PIN) change request, and an address change request. Various embodiments associated with first-level and/or second-level access are discussed in greater detail below.

In various embodiments, the first match between the first application user credential and the stored second application user credential serves as a precondition for initiating and completing an online and/or offline verification, and the first-level access and/or the second-level access to one or more features of access application 116 is not granted until completion of at least one of the online and/or offline verification protocols. In various embodiments, the first match between the first application user credential and the stored second application user credential serves as a precondition for commencing either the online and/or offline protocol, but access to first-level information is granted responsive the first match, and where the second-level user access requires, in addition to any other precondition, e.g. a second comparison associated with user information as discussed below, completion of one or both of the online and/or offline protocols to grant access to the second-level information.

Generally, the server 120 (or another computing device) and the contactless card 101 may be provisioned with the same master key 105 (also referred to as a master symmetric key). More specifically, each contactless card 101 is programmed with a distinct master key 105 that has a corresponding pair in the server 120. For example, when a contactless card 101 is manufactured, a unique master key 105 may be programmed into the memory 102 of the contactless card 101. Similarly, the unique master key 105 may be stored in a record of a customer associated with the contactless card 101 in the account data 124 of the server 120 (and/or stored in a different secure location). The master key may be kept secret from all parties other than the contactless card 101 and server 120, thereby enhancing security of the system 100.

The master keys 105 may be used in conjunction with the counters 104 to enhance security using key diversification. The counters 104 comprise values that are synchronized between the contactless card 101 and server 120. The counter value 104 may comprise a number that changes each time data is exchanged between the contactless card 101 and the server 120 (and/or the contactless card 101 and the mobile device 110). To enable NFC data transfer between the contactless card 101 and the mobile device 110, the account application 113 may communicate with the contactless card 101 when the contactless card 101 is sufficiently close to a card reader 118 (e.g. within NFC range) of the mobile device 110. Card reader 118 may be a digital reader with NFC capabilities, e.g. an NFC reader, and may be configured to read from and/or communicate with contactless card 101 (e.g., via NFC, Bluetooth, RFID, etc.). Therefore, example card readers 118 include NFC communication modules, Bluetooth communication modules, and/or RFID communication modules.

For example, a contactless card and/or a user associated with the contactless card may require authorization or verification to access an access application 116. One or more components of the system 100, including authentication application 114 may initiate a communication (e.g. API call or another suitable mechanism) with the access application 116 to utilize one or more payment protocols to verify or authenticate the contactless card, and/or in various embodiments, a user associated therewith, even if the access application 116, or a particular aspect sought for access by the user of the access application 116, does not involve making a payment.

In various embodiments, the one or more payment protocols may involve online techniques as discussed elsewhere herein. The authentication application 114 may provide a user with a prompt so that the user may tap the contactless card 101 to the mobile device 110, thereby bringing the contactless card 101 sufficiently close to the card reader 118 of the mobile device 110 to enable NFC data transfer between the contactless card 101 and the card reader 118 of the mobile device 110. In various embodiments, the mobile device 110 may trigger the card reader 118 via an API call. In addition, and/or alternatively, the mobile device 110 may trigger the card reader 118 based on periodically polling the card reader 118. More generally, the mobile device 110 may trigger the card reader 118 to engage in communications using any feasible method.

In various embodiments, prior to initiating any communication in relation to the contactless card 101, the card reader 118, and the mobile device 110, and/or immediately after establishing a communication between the contactless card 101 and the card reader 118, the verification application 114 may receive a first application user credential as a precondition for card activation and/or for commencing with the online authentication protocol. A user may provide the first application user credentials after receiving a prompt from the authentication application to enter the credentials. As noted above, the first application user credentials may include biometrics data, an established gesture associated with user recognition, a username and password combination, facial recognition, and/or the like. As noted above, in various embodiments, the verification application 114 communicates the first application user credentials to the processor 119. The processor 119 compares the first application user credentials with stored second application user credential. The stored second application user credential may be located within a memory 111 associated with the mobile device 110, the memory 102 associated with contactless card 101, and/or a memory 122 associated with the server 120. In various embodiments, the first application user credential is provided to the server 120, and the server 120 compares the first application user credential to the stored second application user credential. In various embodiments, as noted above, the processor 119 communicates the comparison result to the verification application 114 (e.g., for a match). In various embodiments, a first match may initiate or serve as precondition for one or more of i) initiating the rest of the online verification protocol for verifying or authenticating the user to access the access application 116 and/or ii) grants the user access to first-level user account options of a user account associated with access application 116 (e.g., display of an account balance and/or recent transactions and/or recent communications). As such, in various embodiments, responsive to finding a first match the verification authentication application initiates additional operations (associated with the online verification process) to verify the user identity, including but not limited to authenticating a contactless card associated with the user.

In various embodiments, a second-level verification may be initiated as a further condition for commencing or initiating additional operations. For example, the processor 119 compares at least a portion of the user identity with at least a portion of the cardholder identification information. In various embodiments, a second match grants the user access to second-level user account options of a user account (e.g. a card activation, a personal identification number (PIN) change request, and an address change request). According to various embodiments, the second-level user account options represent more secured features associated with access application 116.

In various embodiments, as implied above, neither a first-level nor a second-level verification, and the online verification may occur directly when communication in relation to the mobile device 110, card reader 118, and contactless card 101 (e.g. NFC communication) is established. In various embodiments, as discussed herein, when an offline authentication is used with an online authentication to authenticate the contactless card and/or the user associated therewith (e.g. hybrid online/offline authentication), the first-level verification is associated with commencing an online or offline portion of the hybrid online/offline authentication, and the second-level verification is associated with commencing the other of the online or offline portion of the hybrid online/offline authentication.

In various embodiments, the first match of the first application user credential to the stored second application user credential may or may not grant first-level access to an application, e.g. access application 116, but the first match serves may, in any event, serve as a precondition for initiating at least one of the online and/or offline protocols. In various embodiments where the first-level access was not granted initially, successful completion of the at least one online and/or offline protocol results in granting first-level access. In various embodiments, the second-level access to access application 116 is granted immediately upon completion of at least one of the online and/or offline verification protocols. In various embodiments, where the first-level access was granted only after completion of at least one of the online and/or offline protocol, including embodiments where the first match was used or omitted, the second-level access is granted only upon the other of the at least one of the online and/or offline protocol being successfully completed, where in various embodiments, the other of the at least one of the online and/or offline protocol is initiated only after a suitable component successfully completes a second match, e.g. compares at least a portion of the user identity with at least a portion of the cardholder identification information. In various embodiments, the successful completion of the second match, by itself, grants access to the second level feature of access application 116 and serves as a precondition to completing the other of the at least one offline and/or online protocol (the one not associated with the first-level access), and successful completion of the other of that least one offline and/or online protocol grants access to additional features of access application 116.

In various embodiments, additional preconditions may be applied as a condition of initiating either the offline and/or online protocol, such as, as discussed elsewhere herein, commencing the offline authentication protocol only if there is a network failure preventing the online authentication from taking place.

In various embodiments, irrespective of any other preconditions, a first tap of the contactless card 101 on the mobile device 110 initiates one of the online and offline verification protocols and a second tap, subsequent tap, initiates the other one of the online and offline verification protocols.

In various embodiments, whether a first-level and/or second-level and/or additional precondition is applied or takes place, after communication has been established between mobile device 110 and contactless card 101, the contactless card 101 generates a message authentication code (MAC) cryptogram. In various embodiments, this may occur when the contactless card 101 is read by the account application 113. In particular, this may occur upon a read, such as an NFC read, of a near field data exchange (NDEF) tag, which may be created in accordance with the NFC Data Exchange Format. For example, a reader, such as the account application 113 and/or the card reader 118, may transmit a message, such as an applet select message, with the applet ID of an NDEF producing applet. In various embodiments, the generated cryptogram may be an authorization request cryptogram (ARQC) consistent with an EMV standard.

In various embodiments, upon confirmation of the selection, a sequence of select file messages followed by read file messages may be transmitted. For example, the sequence may include "Select Capabilities file", "Read Capabilities file", and "Select NDEF file". At this point, the counter value 104 maintained by the contactless card 101 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message). In various embodiments, the MAC cryptogram may be transmitted as an NDEF tag, and in other examples the MAC cryptogram may be included with a uniform resource indicator (e.g., as a formatted string). The contactless card 101 may then transmit the MAC cryptogram to the mobile device 110, which may then forward the MAC cryptogram to the server 120 for verification as explained below. (However, in various embodiments discussed elsewhere herein, e.g. in an offline context, the mobile device 110 may verify the MAC cryptogram).

More generally, when preparing to send data (e.g., to the server 120 and/or the mobile device 110), the contactless card 101 may increment the counter value 104. The contactless card 101 may then provide the master key 105 and counter value 104 as input to a cryptographic algorithm, which produces a diversified key 106 as output. The cryptographic algorithm may include encryption algorithms, hash-based message authentication code (HMAC) algorithms, cipher-based message authentication code (CMAC) algorithms, and the like. Non-limiting examples of the cryptographic algorithm may include a symmetric encryption algorithm such as 3DES or AES128; a symmetric HMAC algorithm, such as HMAC-SHA-256; a symmetric CMAC algorithm such as AES-CMAC; and/or any other algorithm or technique consistent with any applicable version of ISO/IEC 1833 and/or ISO/IEC 7816. The contactless card 101 may then encrypt the data (e.g., the customer identifier 107 and any other data) using the diversified key 106. The contactless card 101 may then transmit the encrypted data (e.g., the encrypted customer ID 109) to the account application 113 of the mobile device 110 (e.g., via an NFC connection, Bluetooth connection, etc.). The account application 113 of the mobile device 110 may then transmit the encrypted data to the server 120 via the network 130. In at least various embodiments, the contactless card 101 transmits the counter value 104 with the encrypted data.

In such embodiments, the contactless card 101 may transmit an encrypted counter value 104, or an unencrypted counter value 104.

Upon receiving the encrypted customer ID 109, the management application 123 of the server 120 may perform the same symmetric encryption using the counter value 104 as input to the encryption, and the master key 105 as the key for the encryption. As stated, the counter value 104 may be specified in the data received from the mobile device 110, or a counter value 104 maintained by the server 120 to implement key diversification for the contactless card 101. The output of the encryption may be the same diversified key value 106 that was created by the contactless card 101. The management application 123 may then decrypt the encrypted customer ID 109 received via the network 130 using the diversified key 106, which reveals the data transmitted by the contactless card 101 (e.g., at least the customer identifier 107). Doing so allows the management application 123 to verify the data transmitted by the contactless card 101 via the mobile device 110, e.g., by comparing the decrypted customer ID 107 to a customer ID in the account data 124 for the account.

Although the counter 104, e.g. ATC, is used as an example, other data may be used to secure communications between the contactless card 101, the mobile device 110, and/or the server 120. For example, the counter 104 may be replaced with a random nonce, generated each time a new diversified key 106 is needed, the full value of a counter value sent from the contactless card 101 and the server 120, a portion of a counter value sent from the contactless card 101 and the server 120, a counter independently maintained by the contactless card 101 and the server 120 but not sent between the two, a one-time-passcode exchanged between the contactless card 101 and the server 120, and a cryptographic hash of data. In various embodiments, one or more portions of the diversified key 106 may be used by the parties to create multiple diversified keys 106.

As shown, the server 120 may include one or more hardware security modules (HSM) 125. For example, one or more HSMs 125 may be configured to perform one or more cryptographic operations as disclosed herein. In various embodiments, one or more HSMs 125 may be configured as special purpose security devices that are configured to perform the one or more cryptographic operations. The HSMs 125 may be configured such that keys are never revealed outside the HSM 125, and instead are maintained within the HSM 125. For example, one or more HSMs 125 may be configured to perform at least one of key derivations, decryption, and MAC operations. The one or more HSMs 125 may be contained within, or may be in data communication with, server 120.

As stated, the key diversification technique may be used to perform secure operations using the contactless card 101. For example, once the management application 123 verifies the encrypted customer ID 109 using key diversification, the management application 123 may transmit a message to the authentication application 114 indicating that the contactless card 101 and/or the user associated therewith is verified and/or authenticated, and the authentication application 114 can grant the user access to the authentication application 116 as a result. In various embodiments, the output transmitted may include an authorization response cryptogram (ARPC).

As is inherent in one or more embodiments described herein, including the above discussion, the server 120 that may be used in an online authentication or verification or an online and offline hybrid operations may be configured to operate consistent with an EMV standard, including performing operations that utilize an EMV payment protocol for non-payment purposes. The host server (or system) 120 may be associated with an issuer, e.g. authentication server of the issuer, of a card associated with a user, and the host system including a non-transitory computer-readable storage medium storing computer-readable program code executable by a processor, where the processor and storage medium may contain one or more hardware or software components, including those generally described in FIG. 8. The host system may be configured to receive a transaction or communication data associated with an access application 116 and/or a contactless card 101. The receipt of the transaction or communication data may be facilitated as described herein, e.g. by a verification application 114 (or other suitable component or application of mobile device 110) associated with a mobile device 110 and the user (or other suitable computer device), where the verification application 114 may initiate an authentication or verification communication with one or more other components, e.g. a contactless card 101 and a card reader 118. The transaction or communication data received by the server 120 from the authentication application 114. The transaction or communication data may include i) a counter (e.g. ATC) and a cryptogram based on one or more inputs of the communication and a symmetric key associated with the card. In various embodiments, the cryptogram is an authorization request cryptogram (ARQC).

In various embodiments, the server 120 may have a separate log, e.g. counter log 121, for logging the ATC value as being associated with a non-payment event or communication, where the one or more inputs provided by the mobile device 110 may include a designation that the event or communication is a non-payment event or communication and/or an indication as to the nature of access application 116. In various embodiments, the server management application 123 of the server 120 may be configured to identify, based on the nature of the access application (e.g. described as part of the inputs to the transaction, event or communication as a gaming application, entertainment application, transportation application, etc.), by retrieving a designation from memory 122, e.g. in account data 124, that the access application 116 does not have payment features and/or that the payment protocol used to verify a contactless card 101 and/or the user associated therewith and in relation to the access application 116 does not employ the payment protocol to complete a payment. In various embodiments, the same protocol may be used to make a payment with respect to access application 116, except an additional condition is imposed to make a payment, e.g. a first-level comparison of user credentials to stored information is made by the management application 123 to enable solely non-payment activity, and a second-level comparison of user credentials to stored information is made to enable payment activity with respect to the access application 116, where the first-level and second level comparison are initiated, respectively, by a first tap and a subsequent second tap of the contactless card 101 on the mobile device 110.

In various embodiments, once the server 120 receives the communication or transaction data, it may transmit a response (e.g. from the issuer, e.g. authentication server of the issuer) to a suitable component of the mobile device 110, e.g. verification application 114, verifying the contactless card 101 and/or the identity of the user associated therewith based on the received cryptogram and the verification application 114 may grant access to a relevant portion or feature of access application 116 as a result. The accesses feature may be the first-level and/or second-level information discussed above, e.g. in embodiments where no user credential comparison takes place, and/or any other suitable feature. In various embodiments, the verification is conducted and based one on or more cryptographic techniques discussed herein, including based on recreating the symmetric key and/or the entire cryptogram (the generation of which is based in party on using the symmetric key) by the issuer, e.g. authentication server of the issuer, in response to receiving the communication or transaction data. Since, in various embodiments, the operations as described in relation to the server 120 are associated with a payment protocol, including for application distinct from access application 116, the cryptogram and cryptographic technique and the transmitted response are based on a payment protocol, but since at least one feature associated with access application 116 is associated with a non-payment feature, and the payment protocol is performed to access the feature, the contactless card verification, and by extension user identity verification or authentication of the user, is also distinct from the payment protocol and competition of the payment protocol. In various embodiments, only the received verification from the server 120, e.g. a purely online technique, may be used to verify or authorize the user for receiving access to one or more features of access application 116.

In various embodiments, the server 120 may utilize the counter log 121 to perform an antifraud measure. In various embodiments, counter log 121 may include time stamps associated with the counter value associated with one or more non-payment events or communications. In various embodiments, the counter log 121 may include time stamps associated with the counter value associated with one or more payment events or communications. In various embodiments, the counter value of the ATC in relation to a particular event or communication, e.g. whether it is a payment event or communication or a non-payment event or communication, may also be logged. The management application 123 may be configured to compare a general number of payment events or communications that take place in between non-payment events or communications. If the number of payment events or communication after a non-payment event or communication exceeds a certain threshold, the management application 123 may deny the payment events or communications, even if otherwise the event or communication may be completed (e.g. since it is assumed that a user may use the payment protocol for non-payment and payment protocol, an unduly large number of payment events or communications after a non-payment events or communications may be considered fraudulent). In various embodiments, the opposite may be implemented, e.g. a large number of non-payment events or communications being performed after a payment event or communication in excess of a threshold may cause the management application 123 to deny a certain non-payment event or communication when the verification or authentication takes place. In various embodiments, a threshold in relation to time between any event or communication, e.g. payment or non-payment, in terms of exceeding a minimum or maximum threshold may cause the management application 123 to deny the authentication or verification operation. The counter log 121 may be used to perform any other suitable operation, including perform an anti-fraud measure in any other suitable manner.

In addition to the one or more online operations outlined herein and above, the system 100 can facilitate one or more offline operations to verify or authenticate a contactless card and/or user offline, where, in various embodiments, the offline operations are used in combination with an online technique, and where in various embodiments the offline operations may be used based on a precondition, e.g. if a network failure prevents use of the one or more online operations.

In various embodiments, in a similar fashion as discussed in relation to the embodiments described herein with respect to the online verification technique, the verification application 114 receives the first application user credentials in order to access one or more aspects or feature of authentication application 116, where the offline verification or authentication technique may utilize a payment protocol consistent with an EMV standard for purposes other than to complete a payment event or communication. A user may provide the first application user credentials after receiving a prompt from the authentication application. The first application user credentials may include biometrics data, an established gesture associated with user recognition, a username and password combination, facial recognition, and/or the like. In various embodiments, the verification application 114 communicates the first application user credentials to the processor 119. The processor 119 compares the first application user credentials with stored second application user credential. The stored second application user credential may be located within a memory 111 associated with the mobile device 110 or with a memory 102 of contactless card 101.

In various embodiments, the processor 119 communicates the comparison result to the verification application 114 (e.g., for a match). In various embodiments, a first match may grant the user access to first-level aspects, e.g. user account options of a user account, associated with authentication application 116 (e.g., display of an account balance and/or recent events or communications). Responsive to finding a first match, the verification application 114 initiates verifying or authenticating a user identity with one or more offline operations. For example, the authentication application 114 may output for display on the mobile device 110 a notification to bring a contactless card 101 near the mobile device 110. The verification application 114 may then communicate with the contactless card 101 (e.g., after being brought near the contactless card 101). Communication between the verification application 114 and the contactless card 101 may involve the contactless card 101 being sufficiently close to the card reader 118 of the mobile device 110 to enable NFC data transfer between the verification application 114 and the contactless card 101. In various embodiments, the contactless card 101 sends, to the verification application 114, or another suitable component or application of the mobile device 110, a public key of a public/private key pair and cardholder identification information of an account holder of the card, e.g. the contactless card and/or user to be verified or authenticated in relation to access application 116. In various embodiments, the verification application 114, may instruct the contactless card 101 to generate a digital signature using a private key of the key pair of the card. In various embodiments, the cardholder identification information may be incorporated within the digital signature or otherwise conveyed with the digital signature.

In various embodiments, the contactless card 101 sends the digital signature to the verification application 114 or another suitable component or application of the mobile device 110. In various embodiments, the verification application 114 may communicate the digital signature with the processor 119, where the processor 119 may verify the digital signature using the public key. For example, the contactless card 101 may provide a hash of the card's public key encrypted by a trusted source (e.g., a private key of a card provider), and verifying the digital signature may include: decrypting the encrypted hash (e.g., with a public key of the card provider); calculating a new hash of the digital signature; and comparing the decrypted original hash to the new hash for a match, at which point the card provider (e.g., issuer, e.g. authentication server of the issuer), and the transaction card may be authenticated.

In various embodiments, both a READ and WRITE NFC capability may be used to perform at least a portion of the offline authentication (e.g. offline dynamic data authentication) between a contactless card 101 and a user's mobile device 110. In various embodiments, utilizing both the READ and WRITE NFC capability provide unique advantages to more reliably (e.g., with greater security from counterfeiting or card skimming, or man in the middle attacks) authenticate a contactless card 101 (and an associated user) to be used as a form of authentication when accessing one or more aspects of access application 116. In various embodiments, in similar fashion as discussed in relation to the embodiments described herein with respect to the online verification, the processor 119 compares at least a portion of the user identity with at least a portion of the cardholder identification information. In various embodiments, a second match grants the user access to second-level user account options of a user account (e.g. a card activation, a personal identification number (PIN) change request, and an address change request). In various embodiments, the second-level user account options represent more secured features of the access application 116.

In various embodiments, as discussed and implied elsewhere herein, when an offline authentication is used with an online authentication to authenticate the contactless card and/or the user associated therewith (e.g. hybrid online/offline authentication), the first-level verification is associated with commencing an online or offline portion of the hybrid online/offline authentication, and the second-level verification is associated with commencing the other of the online or offline portion of the hybrid online/offline authentication. In various embodiments, additional preconditions may be applied, such as, as discussed elsewhere herein, commencing the offline authentication protocol takes place only if there is a network failure preventing the online authentication from taking place.

In various embodiments, either the mobile device 110 and/or the contactless card 101 may be configured to perform an antifraud measure utilizing a counter log 121 (not expressly shown with respect to the mobile device 110).

In various embodiments, e.g. when both the online and offline techniques are implemented, verifying the digital signature may be performed by a server, e.g. server 120, connected to the mobile device 110, e.g. connected by network 130. For example, processor 119 may output the digital signature for transmission to server 120, and server 120 may verify the digital signature.

FIG. 2A is a schematic 200 depicting an example embodiment of tapping to initiate an online verification or a hybrid online and offline verification or authentication of a user (and/or a contactless card associated therewith) utilizing a payment protocol for purposes distinct from completing a payment. A graphical user interface (GUI) of the verification application 114 on the mobile device 110 may include a prompt 206 to tap the contactless card 101 to initiate an authentication or verification for another application, e.g. access application 116, where a separate API interface may be provided to communicate the verification or authentication (once completed) to the access application 116 by the verification application 114. In various embodiments, the access application 116 provides a prompt 202 as a precondition for receiving the tap prompt 206 or after the tap takes place, but prior to any additional online or offline verification operations, to enter user credentials for comparison (e.g. as described with reference to FIG. 1) for a first-level and/or second-level of information access in relation to access application 116. In various embodiments, verification application 114 provides an interface or the prompt 202 for entering the user credential with respect to access application 116 and/or any other application, e.g. other applications 115.

In various embodiments, once the contactless card 101 is tapped to the mobile device 110, the authentication application 114 transmits, via the card reader 118 (e.g., via NFC, Bluetooth, RFID, etc.), an indication to the contactless card 101. In various embodiments, the indication may specify to perform one or more encryption techniques as described with respect to FIG. 1. In various embodiments, an online authentication technique is used, and the verification application 114 receives transaction or communication data from the server 120. In various embodiments, an online and offline authentication technique is used, and the verification application 114 and the contactless card 101 utilize public/private key encryption techniques to authenticate the contactless card 101 and/or the user associated therewith. In various embodiments, the prompt to transmit data between the contactless card 101 and the mobile device 110 may specify to transmit the data to the authentication application 114 via any suitable protocol consistent with an EMV protocol or standard, where in various embodiments the authentication application 114 receives any suitable data directly from the contactless card 101 via a protocol consistent with an EMV protocol or standard. In various embodiments, the tapping may be associated with one or both of a first-level and a second-level information access as described herein, where the first tap results in a comparison of a first and/or a second user and/or additional user credential information prior to instituting a verification and/or authentication technique (e.g. online and/or online/offline hybrid).

FIG. 2B is a schematic 210 depicting an example embodiment of tapping to initiate an online verification or a hybrid online and offline verification or authentication of a user utilizing a payment protocol for purposes distinct from completing a payment. Whether an online verification or authentication that includes utilizing a server 120 is used to perform the authentication or verification of the contactless card 101 and/or the user associated therewith, whether an offline verification that includes utilizing the mobile device 110, the contactless card 101 and/or card reader 118 is used to perform the authentication or verification of the user without the server 120, and/or whether a hybrid offline and online verification that includes utilizing a mobile device 110, a card reader 118, a contactless card 101, and/or a server 120 is used to perform the authentication or verification of the contactless card and/or the user, the mobile device 110, a message 207 indicating that access to the access application 116 is granted may appear on the GUI of the mobile device 110. In various embodiments, access is granted without a message prompt.

FIG. 3A is a schematic 300 depicting an example embodiment of tapping to initiate an online verification or authentication or an offline verification or authentication of a user (and/or contactless card associated therewith) utilizing a payment protocol for purposes distinct from completing a payment. Generally, FIGS. 3A-3C reflect various embodiments where successive taps are used to grant a first-level of information associated with an application and a second-level information of associated with an application in turn associated with a contactless card and/or a user associated with the contactless card and application.

As similarly described with reference to FIG. 2A, a graphical user interface (GUI) of the verification application 114 on the mobile device 110 may include a prompt 302 to tap the contactless card 101 to initiate an authentication or verification for another application, e.g. access application 116, where a separate API interface may be provided to communicate the verification or authentication (once completed) to the access application 116 by the verification application 114. In various embodiments, the access application 116 provides a prompt 304 prior to or as a precondition to the tap prompt 302, or immediately after the tap is made, but before any additional online or offline verification or authentication operations are performed, to enter user credentials for comparison (e.g. as described with reference to FIG. 1 and FIG. 2A) for a first-level of information access in relation to access application 116. In various embodiments, verification application 114 provides an interface or prompt 304 for entering the user credential with respect to access application 116 and/or any other application, e.g. other applications 115. Once the contactless card 101 is tapped to the mobile device 110, the authentication application 114 transmits, via the card reader 118 (e.g., via NFC, Bluetooth, RFID, etc.), an indication to the contactless card 101. In various embodiments, the indication may specify to perform one or more encryption techniques as described with respect to FIG. 1 and FIG. 2A. In various embodiments, a prompt 304 is provided by an application, e.g. access application 116 or verification application 114. The prompt 304 may be initiated, as already stated, in response to tapping the contactless card on the mobile device 110 or as a precondition to the tap being effective.

In various embodiments, as similarly discussed with reference to FIG. 1 and FIG. 2A, a first application user credential, which may include biometrics data, an established gesture associated with user recognition, a username and password combination, and/or the like, is compared, e.g. by a processor 119 of the mobile device 110, to a stored second application user credential. The stored second application user credential may be associated with the user identity and it may be stored either in the memory 111 of mobile device 110, the memory 102 of the contactless card, or in the memory 122 of the server 120. In various embodiments, as noted above, upon determining a first match between the first application user credential and the stored second application user credential, the authentication application 114 may grant the user access to one or more first-level user account options of a user account. As noted above, the user account may be a financial account, a health insurance account, and/or any other account of the like associated with any service provider (e.g., a transit account, an entertainment account, etc.). Once verified, the user may access certain first-level user account options. The first-level user account options of a user account may include a display of an account balance, a display of recent events or communications, and/or the like. The first-level verification may also be a precondition for initiating either an offline or online authentication verification technique.

In various embodiments, once the first-level authentication takes place, either an online or an offline authentication as described herein occurs. In various embodiments, an online authentication technique is used, and the verification application 114 receives event or communication data from the server 120. In various embodiments, offline authentication technique is used, and the verification application 114 and the contactless card 101 utilize public/private key encryption techniques to authenticate the contactless card and/or the user by extension therewith. In various embodiments, the prompt to transmit data between the contactless card 101 and the mobile device 110 may specify to transmit the data to the authentication application 114 via any suitable protocol consistent with and EMV protocol or standard, where in various embodiments the authentication application 114 receives any suitable data directly from the contactless card 101 via a protocol consistent with an EMV protocol or standard.

As discussed in more detail with respect to FIG. 3B, once the online or offline authentication or verification technique is completed, a second prompt to tap the card again may be initiated, where the second tap initiates another user credential comparison to grant second-level access to an application associated with a user (and/or a contactless card related thereto) and to perform a second authentication or verification of the user (and/or a contactless card related thereto) in relation to the application, e.g. if the online verification or authentication was performed with respect to the first tap, then the offline verification or authentication is performed with respect to the second tap, and vice versa if the offline verification or authentication was performed with respect to the first tap.

FIG. 3B is a schematic 310 depicting an example embodiment of tapping to initiate an online verification or authentication or an offline verification or authentication of a user utilizing a payment protocol for purposes distinct from completing a payment. In various embodiments, a prompt. As similarly described with reference to FIG. 1, FIG. 2A and FIG. 3A, a graphical user interface (GUI) of the verification application 114 on the mobile device 110 may include a prompt 306 to tap the contactless card 101 to initiate an authentication or verification for another application, e.g. access application 116, where a separate API interface may be provided to communicate the verification or authentication (once completed) to the access application 116 by the verification application 114. In various embodiments, the prompts 306 and 308 associated with schematic 320 are available only after first-level authentication has occurred and either one of an online or offline verification or authentication as outlined in FIG. 3A takes place, and the tap associated with schematic 320 would be a second tap of the contactless card 101 on mobile device 110. In various embodiments, the access application 116 provides a prompt 302 as a precondition for receiving the second tap prompt 306 or after the tap takes place, but prior to any additional online or offline verification operations, to enter user credentials for comparison (e.g. as described with reference to FIG. 1) for a second-level of information access in relation to access application 116. The second-level of information is an additional access of more sensitive information that may be provided in addition to the first-level access described in FIG. 3A, where the types of information and applications associated therewith have been described with reference to at least one of FIG. 1, FIG. 2A, and FIG. 3A. In various embodiments, verification application 114 provides an interface or the prompt 308 for entering the user credential with respect to access application 116 and/or any other application, e.g. other applications 115.

As similarly described with reference to FIG. 1, FIG. 2A and FIG. 3A, once the contactless card 101 is tapped to the mobile device 110, the authentication application 114 transmits, via the card reader 118 (e.g., via NFC, Bluetooth, RFID, etc.), an indication to the contactless card 101. In various embodiments, the indication may specify to perform one or more encryption techniques as described with respect to FIG. 1, except that, in various embodiments, if an online verification technique utilizing server 120 was employed with respect to FIG. 3A, an offline operation is performed with respect to FIG. 3B, and vice versa. Once verified pursuant to the additional online or offline verification technique initiated in association with the second tap, the user may access certain second-level user account options. In various embodiments, in similar fashion as discussed in relation to the embodiments described herein, the processor 119 compares at least a portion of the user identity with at least a portion of the cardholder identification information, which may be located in the memory 102 of the contactless card 101, the memory 122 of the server, and or the memory 111 of the mobile device 110 (and accessed and used accordingly depending on whether an online or offline technique is employed). In various embodiments, a second match grants the user access to second-level user account options of a user account (e.g. a card activation, a personal identification number (PIN) change request, and an address change request). In various embodiments, the second-level user account options represent more secured features of the access application 116.

In various embodiments, once the first-level authentication takes place, either an online or an offline authentication as described herein occurs. In various embodiments, an online authentication technique is used, and the verification application 114 receives event or communication data from the server 120. In various embodiments, offline authentication technique is used, and the verification application 114 and the contactless card 101 utilize public/private key encryption techniques to authenticate the contactless card and/or the user associated therewith. In various embodiments, the prompt to transmit data between the contactless card 101 and the mobile device 110 may specify to transmit the data to the authentication application 114 via any suitable protocol consistent with and EMV protocol or standard, where in various embodiments the authentication application 114 receives any suitable data directly from the contactless card 101 via a protocol consistent with an EMV protocol or standard.

FIG. 3C is a schematic 320 depicting an example embodiment of tapping to initiate an online verification and offline verification or authentication of a user utilizing a payment protocol for purposes distinct from completing a payment. Once both the online and offline verification techniques, which may include utilizing one or more of the mobile device 110, the card reader 118, the contactless card 101 and the server 12, are employed and completed, where in various embodiments the techniques are completed in response to a first and second tap as described with respect to FIG. 3A and FIG. 3B, and in response to comparing user credentials to stored information for a first-level and second-level access, a message 312 indicating that access to the access application 116, including both the first-level and second-level information or features, is granted may appear on the GUI of the mobile device 110. In various embodiments, access is granted without a message prompt.

Figure 4A:
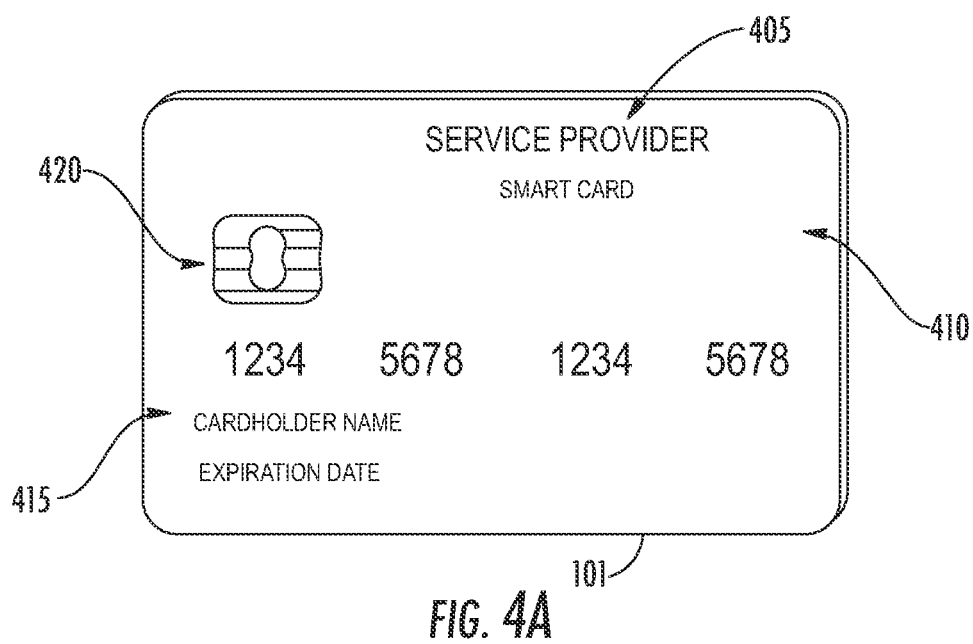
FIGS. 4A-4B illustrate an example of a contactless card.

FIG. 4A illustrates a contactless card 101, which may comprise a payment card, such as a credit card, debit card, and/or a gift card. As shown, the contactless card 101 may be issued by a service provider 405 displayed on the front or back of the card 101. In various embodiments, the contactless card 101 is not related to a payment card, and may comprise, without limitation, an identification card. In various embodiments, the payment card may comprise a dual interface contactless payment card. The contactless card 101 may comprise a substrate 410, which may include a single layer, or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In various embodiments, the contactless card 101 may have physical characteristics compliant with the ID-1 format of the ISO/IEC 7810 standard, and the contactless card may otherwise be compliant with the ISO/IEC 14443 standard. However, it is understood that the contactless card 101 according to the present disclosure may have different characteristics, and the present disclosure does not require a contactless card to be implemented in a payment card.

The contactless card 101 may also include identification information 415 displayed on the front and/or back of the card, and a contact pad 420. The contact pad 420 may be configured to establish contact with another communication device, such as the mobile devices 110, a user device, smart phone, laptop, desktop, or tablet computer. The contactless card 101 may also include processing circuitry, antenna and other components not shown in FIG. 4A. These components may be located behind the contact pad 420 or elsewhere on the substrate 410. The contactless card 101 may also include a magnetic strip or tape, which may be located on the back of the card (not shown in FIG. 4A).

Figure 4B:
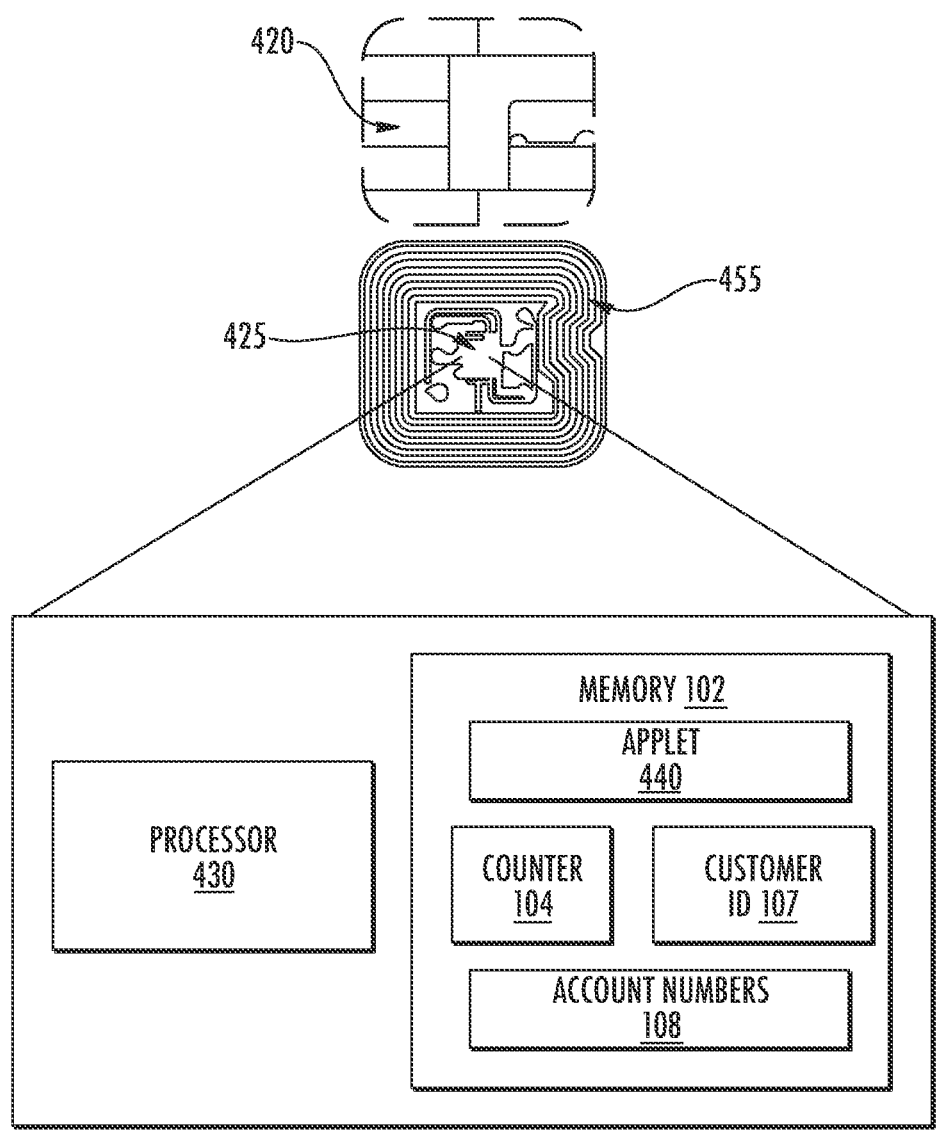

As illustrated in FIG. 4B, the contact pad 420 of contactless card 101 may include processing circuitry 425 for storing and processing information, including a microprocessor 430 and the memory 102. It is understood that the processing circuitry 425 may contain additional components, including processors, memories, error and parity/CRC checkers, data encoders, anticollision algorithms, controllers, command decoders, security primitives and tamperproofing hardware, as necessary to perform the functions described herein.

The memory 102 may be a read-only memory, write-once read-multiple memory or read/write memory, e.g., RAM, ROM, and EEPROM, and the contactless card 101 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory.

The memory 102 may be configured to store one or more applets 440, one or more counters 104, a customer identifier 107, and the virtual account numbers 108. The one or more applets 440 may comprise one or more software applications configured to execute on one or more contactless cards, such as a Java® Card applet. However, it is understood that applets 440 are not limited to Java Card applets, and instead may be any software application operable on contactless cards or other devices having limited memory. The one or more counters 104 may comprise a numeric counter sufficient to store an integer. The customer identifier 107 may comprise a unique alphanumeric identifier assigned to a user of the contactless card 101, and the identifier may distinguish the user of the contactless card from other contactless card users. In various embodiments, the customer identifier 107 may identify both a customer and an account assigned to that customer and may further identify the contactless card associated with the customer's account. As stated, the account numbers 108 may include thousands of one-time use virtual account numbers associated with the contactless card 101. An applet 440 of the contactless card 101 may be configured to manage the account numbers 108.

The processor and memory elements of the foregoing exemplary embodiments are described with reference to the contact pad, but the present disclosure is not limited thereto. It is understood that these elements may be implemented outside of the pad 420 or entirely separate from it, or as further elements in addition to processor 430 and memory 102 elements located within the contact pad 420.

In various embodiments, the contactless card 101 may comprise one or more antennas 455. The one or more antennas 455 may be placed within the contactless card 101 and around the processing circuitry 425 of the contact pad 420. For example, the one or more antennas 455 may be integral with the processing circuitry 425 and the one or more antennas 455 may be used with an external booster coil. As another example, the one or more antennas 455 may be external to the contact pad 420 and the processing circuitry 425.

In an embodiment, the coil of contactless card 101 may act as the secondary of an air core transformer. The terminal may communicate with the contactless card 101 by cutting power or amplitude modulation. The contactless card 101 may infer the data transmitted from the terminal using the gaps in the contactless card's power connection, which may be functionally maintained through one or more capacitors. The contactless card 101 may communicate back by switching a load on the contactless card's coil or load modulation. Load modulation may be detected in the terminal's coil through interference. More generally, using the antennas 455, processing circuitry 425, and/or the memory 102, the contactless card 101 provides a communications interface to communicate via NFC, Bluetooth, and/or Wi-Fi communications.

As explained above, contactless cards 101 may be built on a software platform operable on smart cards or other devices having limited memory, such as JavaCard, and one or more or more applications or applets may be securely executed. Applets 440 may be added to contactless cards to provide a one-time password (OTP) for multifactor authentication (MFA) in various mobile application-based use cases. Applets 440 may be configured to respond to one or more requests, such as near field data exchange requests, from a reader, such as a mobile NFC reader (e.g., of the mobile device 110), and produce an NDEF message that comprises a cryptographically secure OTP encoded as an NDEF text tag.

One example of an NDEF OTP is an NDEF short-record layout (SR=1). In such an example, one or more applets 440 may be configured to encode the OTP as an NDEF type 4 well known type text tag. In various embodiments, NDEF messages may comprise one or more records. The applets 440 may be configured to add one or more static tag records in addition to the OTP record.

In various embodiments, the one or more applets 440 may be configured to emulate an RFID tag. The RFID tag may include one or more polymorphic tags. In various embodiments, each time the tag is read, different cryptographic data is presented that may indicate the authenticity of the contactless card. Based on the one or more applications, an NFC read of the tag may be processed, the data may be transmitted to a server, such as the server 120, and the data may be validated at the server.

In various embodiments, the contactless card 101 and server 120 may include certain data such that the card may be properly identified. The contactless card 101 may comprise one or more unique identifiers (not pictured). Each time a read operation takes place, the counters 104 may be configured to increment. In various embodiments, each time data from the contactless card 101 is read (e.g., by a mobile device 110), the counter 104 is transmitted to the server for validation and determines whether the counter values 104 are equal (as part of the validation).

The one or more counters 104 may be configured to prevent a replay attack. For example, if a cryptogram has been obtained and replayed, that cryptogram is immediately rejected if the counter 104 has been read or used or otherwise passed over. If the counter 104 has not been used, it may be replayed. In various embodiments, the counter that is incremented on the card is different from the counter that is incremented for events or communications. The contactless card 101 is unable to determine the application transaction counter 104 since there is no communication between applets 440 on the contactless card 101. In various embodiments, the contactless card 101 may comprise a first applet 440-1, which may be a transaction applet, and a second applet 440-2. Each applet 440-1 and 440-2 may comprise a respective counter 104.

In various embodiments, the counter 104 may get out of sync. In various embodiments, to account for accidental reads that initiate transactions, events or communications, such as reading at an angle, the counter 104 may increment but the application does not process the counter 104. In various embodiments, when the mobile device 110 is woken up, NFC may be enabled and the device 110 may be configured to read available tags, but no action is taken responsive to the reads.

To keep the counter 104 in sync, an application, such as a background application, may be executed that would be configured to detect when the mobile device 110 wakes up and synchronize with the server 120 indicating that a read that occurred due to detection to then move the counter 104 forward. In other examples, Hashed One Time Password may be utilized such that a window of mis-synchronization may be accepted. For example, if within a threshold of 10, the counter 104 may be configured to move forward. But if within a different threshold number, for example within 10 or 1000, a request for performing re-synchronization may be processed which requests via one or more applications that the user tap, gesture, or otherwise indicate one or more times via the user's device. If the counter 104 increases in the appropriate sequence, then it possible to know that the user has done so.

The key diversification technique described herein with reference to the counter 104, master key 105, and diversified key 106 is one example of encryption and/or decryption a key diversification technique. This example key diversification technique should not be considered limiting of the disclosure, as the disclosure is equally applicable to other types of key diversification techniques.

During the creation process of the contactless card 101, two cryptographic keys may be assigned uniquely per card. The cryptographic keys may comprise symmetric keys which may be used in both encryption and decryption of data. Triple DES (3DES) algorithm may be used by EMV and it is implemented by hardware in the contactless card 101. By using the key diversification process, one or more keys may be derived from a master key based upon uniquely identifiable information for each entity that requires a key.

In various embodiments, to overcome deficiencies of 3DES algorithms, which may be susceptible to vulnerabilities, a session key may be derived (such as a unique key per session) but rather than using the master key, the unique card-derived keys and the counter may be used as diversification data. For example, each time the contactless card 101 is used in operation, a different key may be used for creating the message authentication code (MAC) and for performing the encryption. This results in a triple layer of cryptography. The session keys may be generated by the one or more applets and derived by using the application transaction counter (ATC) with one or more algorithms (as defined in EMV 4.3 Book 2 A1.3.1 Common Session Key Derivation).

Further, the increment for each card may be unique, and assigned either by personalization, or algorithmically assigned by some identifying information. For example, odd numbered cards may increment by 2 and even numbered cards may increment by 5. In various embodiments, the increment may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In another example, the NDEF record may be encoded in hexadecimal format.

Figure 5:
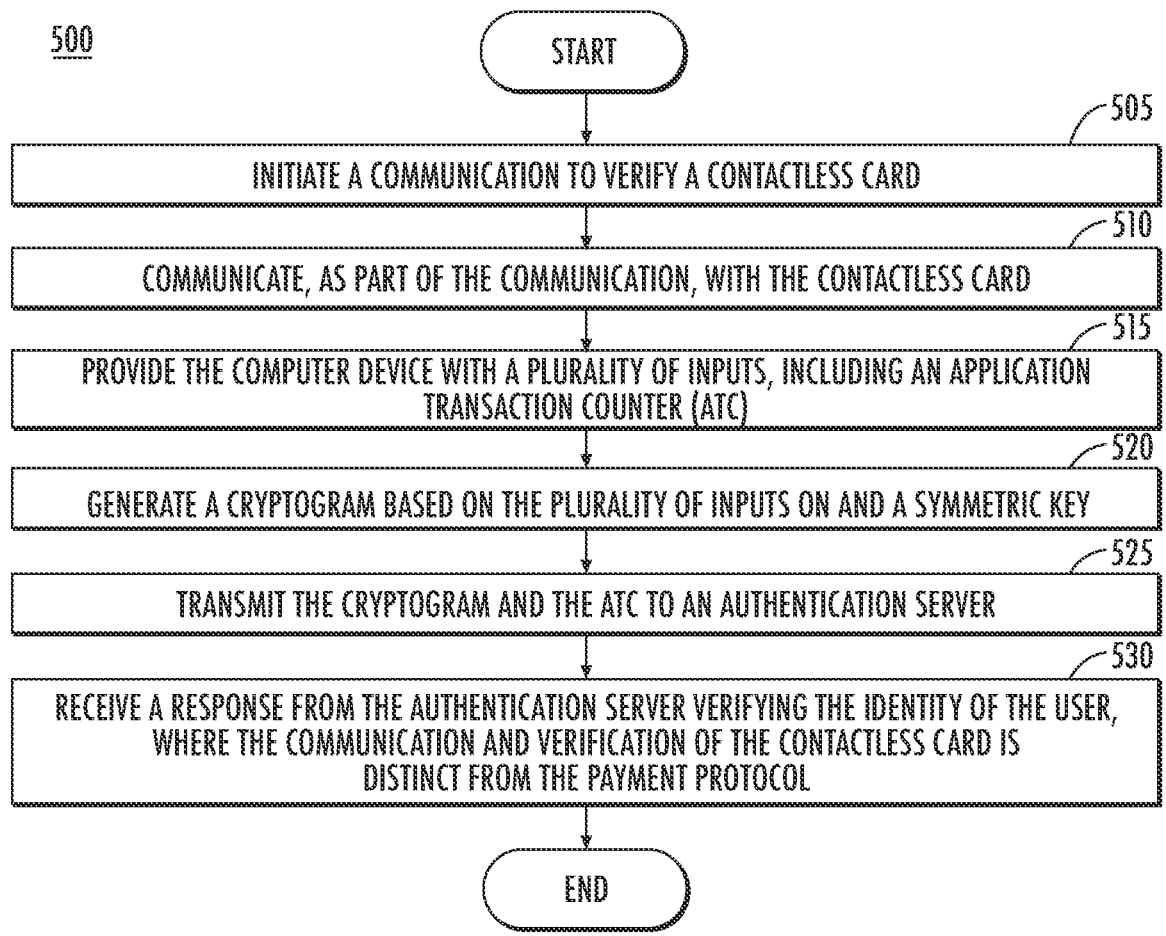
FIG. 5 illustrates an embodiment of a first logic flow.

FIG. 5 illustrates an embodiment of a logic flow 500. The logic flow 500 may be representative of some or all of the operations executed by one or more embodiments described herein. For example, the logic flow 500 may include some or all of the operations to verify or authenticate a user utilizing an online authentication payment technique, but at least in part for purposes distinct than for completing a payment, consistent with an EMV standard. Embodiments are not limited in this context.

As shown, the logic flow 500 begins at block 505, where at least one of the verification application 114, the OS 112, the management application 123, and/or any other suitable application may initiate a transaction, event or communication to verify a contactless card, and in various embodiments, by extension thereto, an identity of a user associated with the contactless card 101. In various embodiments, the verification may commence by tapping the contactless card 101 on the mobile device 110. In various embodiments, the access application 116 provides a prompt with a precondition for receiving the tap prompt or immediately after the tap takes place, but prior to any additional online verification operations, to enter user credentials for comparison for a first-level and/or second-level of information access in relation to access application 116, where the nature of the first-level and/or second-level information and/or features are described elsewhere herein. In various embodiments, the user credential is associated with a user profile and entered into an interface provided by the mobile device 110, where as stated, the first application user credential may include biometrics data, an established gesture associated with user recognition, a username and password combination, and/or the like. The first application user credential may be transmitted by the verification application 114 to the management application 123 of the server 120, where the first application user credential is compared to a stored second credential.

At block 510, and pursuant to various embodiments, if a match is found, a communication between the mobile device 110 and the contactless card 101 is initiated, where the communication utilizes a card reader 118 and where the communication is based on an NFC protocol. In various embodiments, instead of sending the first application credential for comparison at the server 120, the comparison is done between the mobile device 110 and the contactless card 101, where the stored second credential is stored in a memory 102 of the contactless card. In various embodiments, the comparison with respect to the user credential is omitted, and a tap of the contactless card 101 on the mobile device 110 initiates a prompt to select which application requires authentication, e.g. access application 116, and the NFC communication between the contactless card 101 and the mobile device 110 commences to initiate online verification or authentication of a user using a payment protocol consistent with an EMV standard, but for purposes that include a verification or authentication for purposes other than merely completing a sale or purchase. In various embodiments, either the tap or the user credential comparison may be a precondition for the tap or the user credential comparison to occur, and by extension, serve a precondition for the rest of the flow associated with flow 500.

At block 515, and pursuant to various embodiments, the contactless card 101 may provide the mobile device 110, by the communication with the card and as part of the transaction, event or communication, with one or more inputs, including an application transaction counter (ATC) and at block 520, the contactless card 101 in communication with the mobile device 110 may generate a cryptogram, such as an ARQC, based on the plurality of inputs of the transaction, event or communication and a symmetric key associated with the card. In various embodiments, blocks 515 and 520 may be combined into a single or concurrent sequence. In various embodiments, the operations may run separately. In various embodiments, the receipt of inputs by the mobile device 110 and the generation of the cryptogram by the contactless card may involve one or more operations. The operations may involve that the verification application 114 may transmit an indication to the contactless card 101 via the NFC card reader 118 specifying to generate and transmit encrypted data. The operations may further include that the contactless card 101 may increment the counter value 104 in the memory 102 responsive to receiving the indication to generate encrypted data. The operations may further include that the contactless card 101 generate the diversified key 106 using the counter value 104 and the master key 105 in the memory 102 and a cryptographic algorithm. The operations may further include that the contactless card 101 encrypts data (e.g., the customer identifier 107) using the diversified key 106 and the cryptographic algorithm, generating encrypted data (e.g., the encrypted customer ID 109). The operations may further include that the contactless card 101 may transmit the encrypted data to the verification application 114 of the mobile device 110, e.g., using NFC. In various embodiments, the contactless card 101 further includes an indication of the counter value 104 along with the encrypted data.

At block 525, the verification application 114 of the mobile device 110 may transmit the data received from the contactless card 101 to the management application 123 of the server 120 (which may be associated, as stated above, with the issuer of the contactless card 101). At block 530, the mobile device 110 may receive a response from the issuer by the server 120 verifying the contactless card, and/or the identity of the user as a result therewith, based on the transmitted cryptogram (and other transmitted information), where the received response is based on recreating the symmetric key and/or the entire cryptogram, e.g. at a server 120 associated with the issuer (generated in party by using the symmetric key), by the issuer, e.g. authentication server of the issuer, in response to receiving the cryptogram. In various embodiments, one or more operations are associated with block 525. The operations may include that the management application 123 of the server 120 generate a diversified key 106 using the master key 105 and the counter value 104 as input to a cryptographic algorithm. In various embodiments, the management application 123 uses the counter value 104 provided by the contactless card 101. In various embodiments, the management application 123 increments the counter value 104 in the memory 122 to synchronize the state of the counter value 104 in the memory 122 with the counter value 104 in the memory 102 of the contactless card 101. Accordingly, in various embodiments, not only is the user (and/or contactless card) verified, but the counter, e.g. an ATC, is synchronized between the contactless card 101 and the server 120, which may mitigate errors in processing subsequent transactions, events or communications.

In various embodiments, the above operations and blocks associated with FIG. 5 are consistent with an EMV standard, and the generate cryptogram and the received response associated therewith are part of a payment protocol, except that when initiated by the access authentication application 114, the verification and authentication derived from executing the payment protocol were for purposes distinct from completing a payment, e.g. acquiring access to one or more non-payment features of access application 116.

Figure 6:
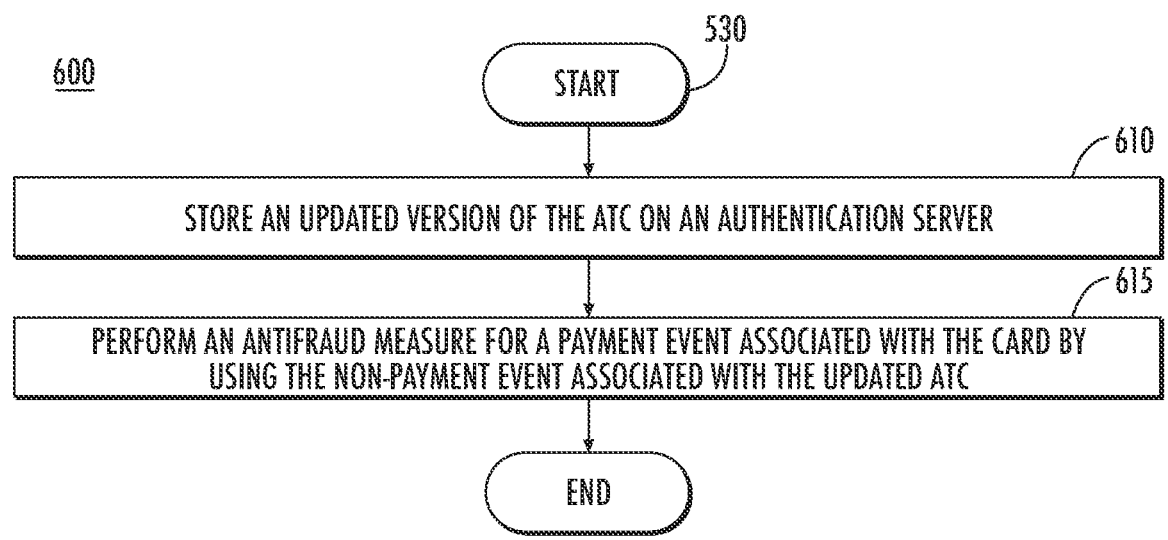
FIG. 6 illustrates an embodiment of a second logic flow.

FIG. 6 illustrates an embodiment of a logic flow 600. The logic flow 600 may be representative of some or all of the operations executed by one or more embodiments described herein. For example, the logic flow 600 may include utilizing an updated ATC associated with the verification or authentication operations of FIG. 5 in order to perform an antifraud measure. Embodiments are not limited in this context.

As shown, the logic flow 600 begins after one or more operations of FIG. 5 are completed, where in various embodiments, the flow begins at block 530 of FIG. 5. At block 610, an updated version of the ATC is stored on the host device associated with the issuer, e.g. server 120. Accordingly, in various embodiments, flow 600 is associated with at least one embodiment of FIG. 5 where the ATC is stored in counter log 121 of the sever 120 and there is a synchronization between the ATC of the contactless card 101 and the ATC stored at the server 120. At block 615, an antifraud measure may be performed by the server 120 utilizing the ATC. In various embodiments, counter log 121 may include time stamps associated with the counter value associated with one or more non-payment event or communication, where the time stamps may be logged by an internal counter or timing device of the sever 120 communicating with the management application 123, and where the management application 123 logs the timing of the event or communication utilizing a timing or clock device. In various embodiments, the counter log 121 may include time stamps associated with the counter value associated with one or more payment events or communications, where again the time stamps may be logged by an internal counter or timing device communicating with the management application 123, and where the management application 123 logs the timing of the event or communication utilizing a timing or clock device. In various embodiments, the counter value of the ATC in relation to a particular event or communication, e.g. whether it is a payment event or communication or a non-payment event or communication, may also be logged by the management application 123. In various embodiments, the management application 123 may be configured to recognize any event or communication stemming from verification application 114 as a non-payment event or communication, irrespective of its particular nature, and any other event or communication utilizing the user's credentials as a payment event or communication. Alternatively, the management application 123 may utilize the first-level and second-level user credential scheme outlined herein as a mechanism for determining when an event or communication is a payment or non-payment event or communication, e.g. if an event or communication utilizes an operation of the server 120 to perform an authentication and if both a first-level and second-level of access is granted, then it is a payment event or communication, otherwise it is a non-payment event or communication. Any other suitable technique may be used to distinguish and log a event or communication as a payment event or communication or non-payment event or communication.

In various embodiments, as noted above, the management application 123 may be configured to compare a general number of payment events or communications that take place in between non-payment events or communications. If the number of payment events or communications after a non-payment event or communication exceeds a certain threshold, the management application 123 may deny the payment events or communications, even if otherwise the event or communication may be completed (e.g. since it is assumed that a user may use the payment protocol for non-payment and payment protocol, an unduly large number of payment events or communications after a non-payment events or communications may be considered fraudulent). In various embodiments, the opposite may be implemented, e.g. a large number of non-payment events or communications being performed after a payment event or communication in excess of a threshold may cause the management application 123 to deny a certain non-payment event or communication when the verification or authentication takes place. In various embodiments, a threshold in relation to time between any event or communication, e.g. payment or non-payment, in terms of exceeding a minimum or maximum threshold may cause the management application 123 to deny the authentication or verification operation. The counter log 121 may be used to perform any other suitable operation, including perform an anti-fraud measure in any other suitable manner.

Figure 7A:
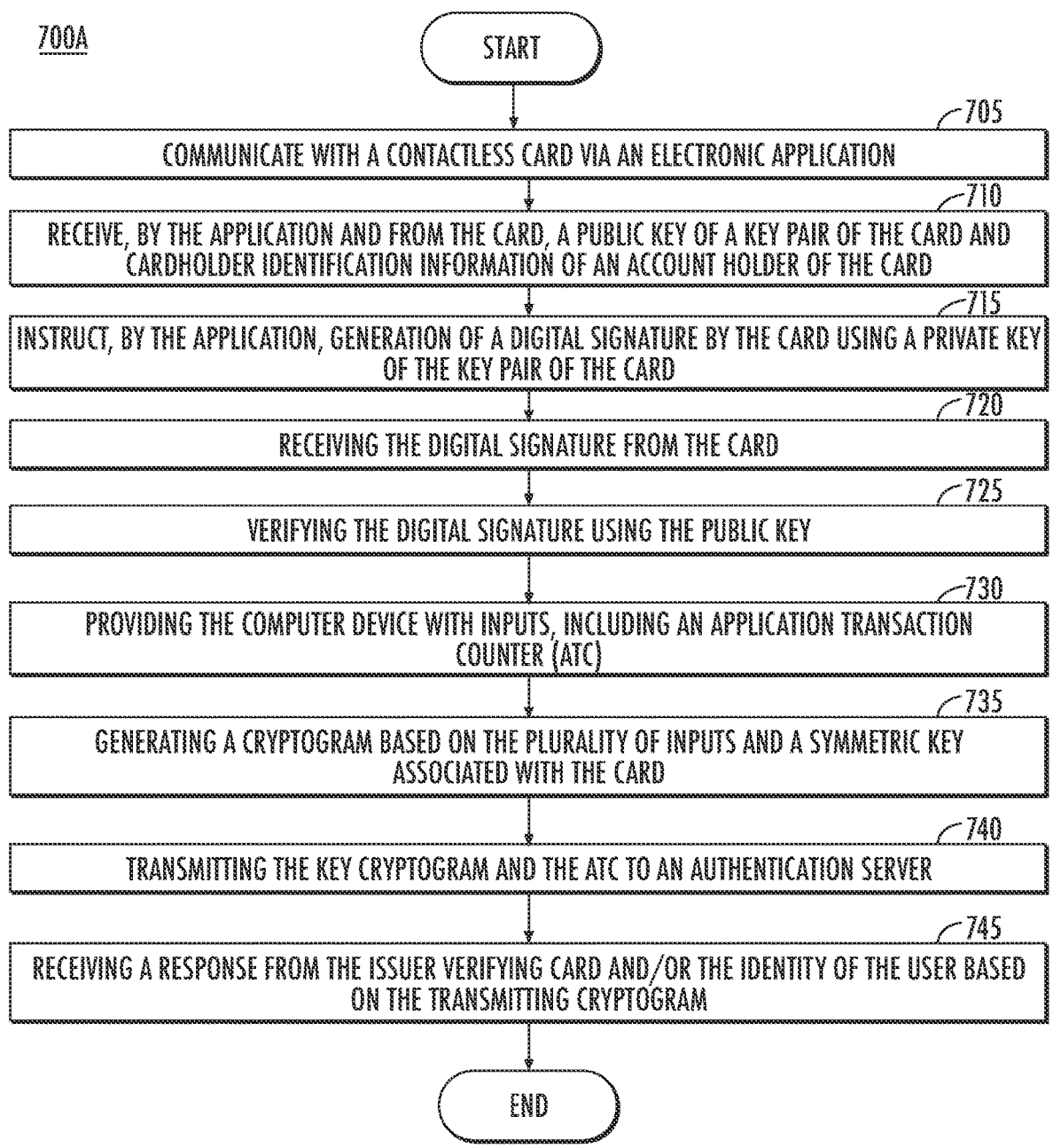
FIG. 7A illustrates an embodiment of a third logic flow.

FIG. 7A illustrates an embodiment of a logic flow 700A. The logic flow 700A may be representative of some or all of the operations executed by one or more embodiments described herein. For example, the logic flow 700A may include some or all of the operations to perform both an online and offline verification and authentication of a user utilizing a payment protocol, but for purposes that includes an authentication or verification distinct from completing a payment. Embodiments are not limited in this context.

Generally, in various embodiments, blocks 710-725 correspond to an offline verification technique and blocks 730-745 correspond to an online verification technique. Either/or of the offline or online verification technique may be initiate first or second, and each may run independent of one another, and in various embodiment verification may occur with utilizing one, but not the other.

As shown, the logic flow 700 begins at block 705, where an application, e.g. verification application 114 of mobile device 110, communicates with a contactless card 101. In various embodiments, the verification application 114 receives, from a user, a first application user credential associated with a user profile. In various embodiments, the communication is initiate by tapping the mobile device 110 with the contactless card 101. As mentioned above, a user may provide the first application user credentials after receiving a prompt from authentication application 114. In various embodiments, as stated above, the first application user credential may include biometrics data, an established gesture associated with user recognition, a username and password combination, and/or the like. In various embodiments, the processor 119 compares the first application user credential with a stored second application user credential. The stored second application user credential may be associated with a user identity. The user identity may include a personal identification number (PIN), a name of the user, an address, a date of birth, and/or the like. In various embodiments, after finding a first match, the verification application 114 grants access to first-level user account options including a display of an account, a display of recent transactions, events, communications, and/or the like. In response to finding a match, the mobile device 110 partially verifies the user identity and initiates an offline verification process by proceeding with one or more of blocks 710-725 (or alternatively, imitating an online verification process and proceeding with one or more of blocks 730-745). In various embodiments, the user credential comparison is skipped (not performed) entirely. At block 710, verification application 114 receives a public key of a public/private key pair of the card from the contactless card 101. In various embodiments, the verification application 114 may also receive card information of the contactless card 108. The card information may include cardholder information such as a personal identification number (PIN), a name of the user, an address, a date of birth, and/or the like.

At block 715, the verification application 114 instructs the contactless card 101 to generate a digital signature by using a private key of the key pair of the card. The contactless card 101 generates the digital signature, and the verification application 114 receives the digital signature from the contactless card 101 at block 720, and where at block 725 the mobile device may verify (by a processor 119 operation and/or utilizing an application, such as verification application 114) the digital signature by using the public key of the key pair of the card.

Once the offline verification is completed, the online operations associated with blocks 730-745 may take place (or if the online operations took place first, then the offline operations may take place). In various embodiments, as a precondition to the online operations (or offline operations taking place), the mobile device 110 processor 119 may compare the card information to the user account (as described above). For example, processor 119 may compare the user identity to cardholder identification information (as described above). In some embodiments after verifying using the contactless card 101, the verification application 114 grants access to second-level user account options including, as non-limiting examples, a card activation, a personal identification number (PIN) change request, an address change request, and/or the like (and as may have been described elsewhere herein). The second-level user account options may have a higher security requirement than the first-level user account options and may be granted, in various embodiments, only after the online (or offline) verification takes place, e.g. the second-level features are granted only after the comparison to the user identity to the cardholder information takes place and after the online verification takes place, e.g. the online (or offline) verification is an additional requirement to granting the second-level account options.

In various embodiments, a first tap of the contactless card 101 on the contactless card 101 serves as a precondition for the first-level information (and/or performing the online or offline operations) and a second tap of the contactless card 101 on the mobile device 110 serves as a precondition for access to the second-level information. (and/or the performing the online or offline operations). The first and second tap may be in lieu of any user credential and/or user information comparison and/or may server as an additional precondition for performing the online and/or offline operations and/or accessing the first-level and/or second level information. In various embodiments, the user credential and information comparison and the tapping may be omitted, and the offline and/or online operations may be the basis for accessing the first level and/or second level information.

In various embodiments, blocks 730-745 correspond to substantially similar operations as those described with respect to blocks 515-530. In various embodiments, once the verification from the issuer, e.g. authentication server of the issuer, is received at block 745, e.g. completing the online verification, the ATC 104 associated with the server 120 that conducted the online verification may be synchronized with the ATC 104 of the contactless card 101, as the a single transaction, event or communication has taken place and verification application 114 may indicated, as part of its communication in one or more of the operation associated with blocks 730-745 that an additional uptick in the contactless card 101 need not occur when running the online operations, if an uptick occurred when the offline verification took place (or vice versa).

Figure 7B:
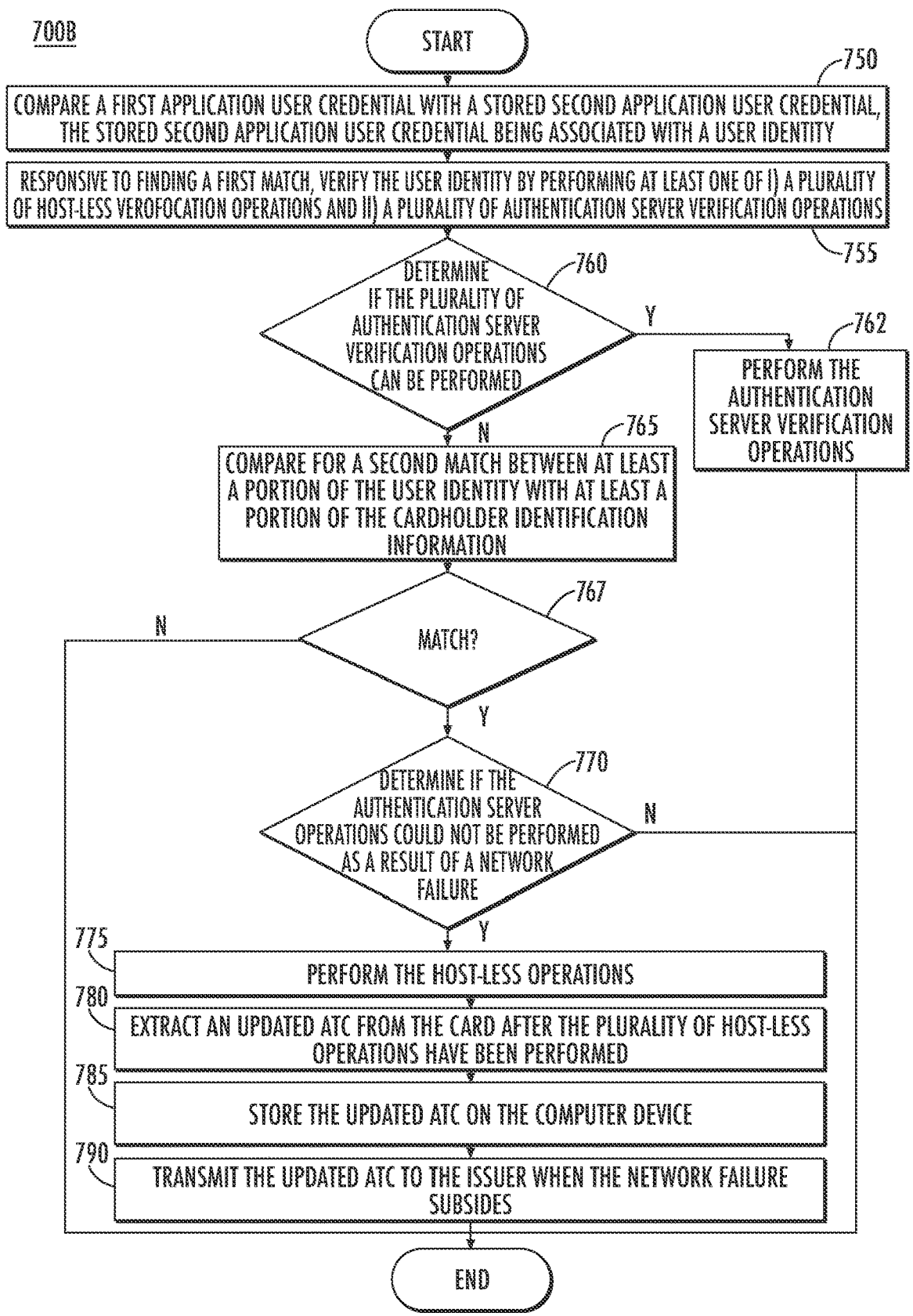
FIG. 7B illustrates an embodiment of a fourth logic flow.

FIG. 7B illustrates an embodiment of a logic flow 700B. The logic flow 700B may be representative of some or all of the operations executed by one or more embodiments described herein. For example, the logic flow 700B may include some or all of the operations to perform both an online and offline verification and authentication of a user utilizing a payment protocol, but for purposes that includes an authentication or verification distinct from completing a payment. Embodiments are not limited in this context.

At block 750, in order to grant a user access (e.g. to one or more features) to an access application 116, the verification application 114 may communicate a first application user credentials to the processor 119. In various embodiments, the communication is initiated by tapping the contactless card 101 on a mobile device 110. In various embodiments, the processor 119 compares the first application user credentials with stored second application user credential. The stored second application user credential may be located within a memory 111 associated with the mobile device 110, the memory 102 associated with contactless card 101, and/or a memory 122 associated with the server 120. In various embodiments, the first application user credential is provided to the server 120, and the server 120 compares the first application user credential to the stored second application user credential. In various embodiments, as noted above, the processor 119 communicates the comparison result to the verification application 114 (e.g., for a match). At block 755, once a suitable component of the mobile device, e.g. the processor 119, and/or a suitable component of the contactless card and/or a suitable component of the server 120, e.g. management application 123, the verification application 114 may initiate at least one of i) one or more host-less (e.g. no server operations) operations (e.g. an offline protocol)

and/or ii) one or more authentication server verification operations (e.g. an online protocol or operation associated with a server). In various embodiments, block 750 is omitted and no match or comparison is conducted with respect to block 750, and the flow proceeds directly to block 760. In various embodiments, if the comparison verifies a match between the first user credentials and the stored second credential, partial access, e.g. first-level access, to one or more features of access application 116 is granted. In various embodiments, the first-level access is granted only if at least one of the authentication server or host-less verification operations is also successfully performed and the contactless card (and/or user) is verified or authorized in relation thereto. Both the host-less and authentication server verification operations are associated with a payment protocol that may be consistent with an EMV standard, where at least one of the protocols may be used to enable a non-payment feature, where the non-payment feature is distinct from the payment feature associated with completing a payment.

At block 760, the verification application 114 determines if the authentication server verification protocol may be performed. For example, the management application 123 may deny the verification a because a hold has been placed on the user account, where the denial is transmitted to the verification application, and/or verification application 114 may determine a network failure. If the verification application 114 determines that the authentication server verification or authorization protocol may be performed, the flow 700B may proceed to block 762 and only perform the issuer verification operations to verify and/or authorize the contactless card and/or user associated therewith. In various embodiments, one or more of the operations associated with FIG. 5 are performed at block 762 to perform the authentication server verification operations and authorize the contactless card and/or user associated therewith, including one or more operations that ensure the application transaction counter value 104 of the server 120 is up to date and current. In various embodiments, after the authentication server verification operations are performed at block 762, and if the contactless card and by extension user associated therewith is successfully verified in accordance with those verification operations, a second-level access to additional features associated with access application 116. In various embodiments, an additional requirement for receiving the second-level access involves the management application 123 of the server making a second comparison, e.g. comparing at least a portion of the user identity with at least a portion of the cardholder identification information (where the cardholder information may be provided from either the contactless card 101 and/or the mobile device). It is noted that the types of first-level and/or second-level access have been outlined above with respect to one or more other embodiments of the present disclosure. In various embodiments, once the authentication server-verification operations and/or the second-level user comparison occurs, the flow 700A ends without performing the offline (e.g. host-less) operations.

If the issuer (e.g. authentication server) or host-based protocol (e.g. online protocol) may not be performed, the flow 700B may proceed to block 765. At block 765, the second comparison of the user identity with cardholder identification information is performed as pre-condition to proceeding with the flow, and a successful second comparison may or may not involve granting second-level access, as at this stage in the flow, neither the offline or online verification has taken place. In various embodiments, the processor 119 compares at least a portion of the user identity with at least a portion of the cardholder identification information, where the cardholder identification information is communicated to the mobile device 110 (e.g. the processor 119 of mobile device 110) as a result of an NFC communication between the contactless card 101 and the mobile device 110. If a match is not found at block 767, the verification ends. In various embodiments, access is denied to one or more features of access application 116 as a result of the ending of the flow 700B at block 767, where the denial may or may not results in denial with respect to the first-level and/or second level access to access application 116. In various embodiments, the second user credential comparison (and/or the first user credential comparison of block 750) is omitted and the flow proceeds directly from block 760 to block 770.

If the comparison of block 767 is successful (e.g. a match is determined) and/or if the operations of block 767 are omitted, the flow 700B may proceed to block 770. At block 770, the verification application 114 determines if the authentication server protocol or operations cannot be performed as a result of a network or technical failure. If the verification application 114 cannot be performed as a result of a network or technical failure, the flow 700A proceeds to block 775 and performs the host-less or offline protocol, where the offline protocol may include one or more of the offline operations as outlined herein, including the operations of blocks 705-725 of FIG. 7A. In various embodiments, block 775 may require a second tap of the contactless card 101 before commencing the offline operations. In various embodiments, successful competition of the offline operations provides a second-level access, in addition to a first-level access which may have been already granted as a result of operations associated with previous blocks, e.g. block 750, and/or successful completion of the offline operations grants a first-level and/or a second-level access with respect to access application 116 if first-level access was not previously granted.

In various embodiments, the flow 700B proceeds from block 775 to block 780. At block 780, the verification application 114 extracts the updated ATC value 104 from the contactless card 101, as a result of the completed offline verification or authentication. The updated ATC value 104 is stored in a memory associated with the mobile device 110. At block 785, the verification application 114 continually polls the network associated with facilitating the communication between the server 120 and mobile device 110 to determine when connectivity is restored, and/or otherwise determines when the technical failure prohibiting communication between the sever 120 and the mobile device 110 subsides. Once network connectivity is restored, at block 790, an updated ATC value 104 is communicated to the sever 120 from the mobile device 110 in order to synchronize the data of the contactless card 101 and the server 120, which can prohibit a verification or authentication error occurs at a subsequent time, e.g. subsequent verification.

In various embodiments, if at block 770 the verification application 114 determines the authentication server operations may not be performed as a result unassociated with a technical failure, then the flow 700B ends without granting access to one or more aspects of access application 116, including a first-level and/or second-level access with respect to access application 114.

In various embodiments, the contactless card 101 may be tapped to a device, such as one or more computer kiosks or terminals, to verify identity so as to receive a transactional item responsive to a purchase, such as a coffee. By using the contactless card 101, a secure method of proving identity in a loyalty program may be established. Securely proving the identity, for example, to obtain a reward, coupon, offer, or the like or receipt of a benefit is established in a manner that is different than merely scanning a bar card. For example, an encrypted transaction may occur between the contactless card 101 and the device, which may be configured to process one or more tap gestures. As explained above, the one or more applications may be configured to validate identity of the user and then cause the user to act or respond to it, for example, via one or more tap gestures. In various embodiments, data for example, bonus points, loyalty points, reward points, healthcare information, etc., may be written back to the contactless card.

In various embodiments, the contactless card 101 may be tapped to a device, such as the mobile device 110. As explained above, identity of the user may be verified by the one or more applications which would then grant the user a desired benefit based on verification of the identity.

In various embodiments, an example authentication communication protocol may mimic an offline dynamic data authentication protocol of the EMV standard that is commonly performed between a transaction card and a point-of-sale device, with some modifications. For example, because the example authentication protocol is not used to complete a payment transaction with a card issuer/payment processor per se, some data values are not needed, and authentication may be performed without involving real-time online connectivity to the card issuer/payment processor. As is known in the art, point of sale (POS) systems submit transactions including a transaction value to a card issuer. Whether the issuer approves or denies the transaction may be based on if the card issuer recognizes the transaction value. Meanwhile, in certain embodiments of the present disclosure, transactions originating from a mobile device lack the transaction value associated with the POS systems. Therefore, in various embodiments, a dummy transaction value (i.e., a value recognizable to the card issuer and sufficient to allow activation to occur) may be passed as part of the example authentication communication protocol. POS based transactions may also decline transactions based on the number of transaction attempts (e.g., transaction counter). A number of attempts beyond a buffer value may result in a soft decline; the soft decline requiring further verification before accepting the transaction. In some implementations, a buffer value for the transaction counter may be modified to avoid declining legitimate transactions.

In various embodiments, the contactless card 101 can selectively communicate information depending upon the recipient device. Once tapped, the contactless card 101 can recognize the device to which the tap is directed and based on this recognition the contactless card can provide appropriate data for that device. This advantageously allows the contactless card to transmit only the information required to complete the instant action or transaction, such as a payment or card authentication. By limiting the transmission of data and avoiding the transmission of unnecessary data, both efficiency and data security can be improved. The recognition and selective communication of information can be applied to a various scenarios, including card activation, balance transfers, account access attempts, commercial transactions, and step-up fraud reduction.

If the tap of the contactless card 101 is directed to a device running Apple's iOS® operating system, e.g., an iPhone, iPod, or iPad, the contactless card can recognize the iOS® operating system and transmit data appropriate data to communicate with this device. For example, the contactless card 101 can provide the encrypted identity information necessary to authenticate the card using NDEF tags via, e.g., NFC. Similarly, if the contactless card tap is directed to a device running the Android® operating system, e.g., an Android® smartphone or tablet, the contactless card can recognize the Android® operating system and transmit appropriate and data to communicate with this device (such as the encrypted identity information necessary for authentication by the methods described herein).

As another example, the contactless card tap can be directed to a POS device, including without limitation a kiosk, a checkout register, a payment station, or other terminal. Upon performance of the tap, the contactless card 101 can recognize the POS device and transmit only the information necessary for the action or transaction. For example, upon recognition of a POS device used to complete a commercial transaction, the contactless card 101 can communicate payment information necessary to complete the transaction under the EMV standard.

In various embodiments, the POS devices participating in the transaction can require or specify additional information, e.g., device-specific information, location-specific information, and transaction-specific information, that is to be provided by the contactless card. For example, once the POS device receives a data communication from the contactless card, the POS device can recognize the contactless card and request the additional information necessary to complete an action or transaction.

In various embodiments the POS device can be affiliated with an authorized merchant or other entity familiar with certain contactless cards or accustomed to performing certain contactless card transactions. However, it is understood such an affiliation is not required for the performance of the described methods.

In various embodiments, such as a shopping store, grocery store, convenience store, or the like, the contactless card 101 may be tapped to a mobile device without having to open an application, to indicate a desire or intent to utilize one or more of reward points, loyalty points, coupons, offers, or the like to cover one or more purchases. Thus, an intention behind the purchase is provided.

In various embodiments, the one or more applications may be configured to determine that it was launched via one or more tap gestures of the contactless card 101, such that a launch occurred at 3:51 pm, that a transaction was processed or took place at 3:56 pm, in order to verify identity of the user.

In various embodiments, the one or more applications may be configured to control one or more actions responsive to the one or more tap gestures. For example, the one or more actions may comprise collecting rewards, collecting points, determine the most important purchase, determine the least costly purchase, and/or reconfigure, in real-time, to another action.

In various embodiments, data may be collected on tap behaviors as biometric/gestural authentication. For example, a unique identifier that is cryptographically secure and not susceptible to interception may be transmitted to one or more backend services. The unique identifier may be configured to look up secondary information about individual. The secondary information may comprise personally identifiable information about the user. In various embodiments, the secondary information may be stored within the contactless card.

In various embodiments, the device may comprise an application that splits bills or check for payment amongst a plurality of individuals. For example, each individual may possess a contactless card, and may be customers of the same issuing financial institution, but it is not necessary. Each of these individuals may receive a push notification on their device, via the application, to split the purchase. Rather than accepting only one card tap to indicate payment, other contactless cards may be used. In various embodiments, individuals who have different financial institutions may possess contactless cards 101 to provide information to initiate one or more payment requests from the card-tapping individual.

In various embodiments, the present disclosure refers to a tap of the contactless card. However, it is understood that the present disclosure is not limited to a tap, and that the present disclosure includes other gestures (e.g., a wave or other movement of the card).

Figure 8:
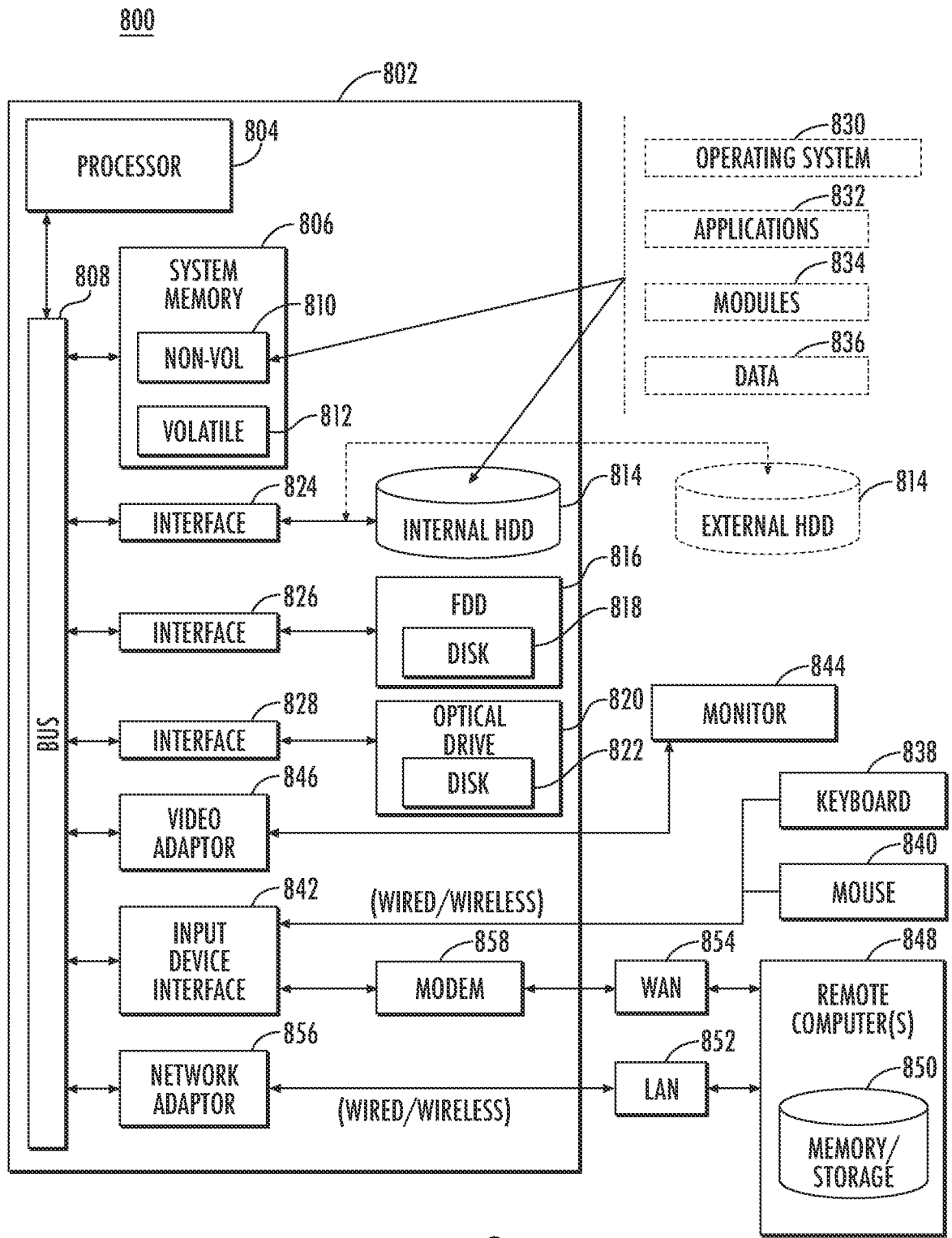
FIG. 8 illustrates an embodiment of a computing architecture.

FIG. 8 illustrates an embodiment of an exemplary computing architecture 800 comprising a computing system 802 that may be suitable for implementing various embodiments as previously described. In various embodiments, the computing architecture 800 may comprise or be implemented as part of an electronic device. In various embodiments, the computing architecture 800 may be representative, for example, of a system that implements one or more components of the system 100. In various embodiments, computing system 802 may be representative, for example, of the mobile devices 110 and server 120 of the system 100. The embodiments are not limited in this context. More generally, the computing architecture 800 is configured to implement all logic, applications, systems, methods, apparatuses, and functionality described herein with reference to FIGS. 1-7B.

As used in this application, the terms "system" and "component" and "module" are intended to refer to a computer-related entity, either hardware, a combination of hardware and software, software, or software in execution, examples of which are provided by the exemplary computing architecture 800. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 802 includes various common computing elements, such as one or more processors, multi-core processors, co-processors, processing circuitry memory units, chipsets, controllers, peripherals, interfaces, oscillators, timing devices, video cards, audio cards, multimedia input/output (I/O) components, power supplies, and so forth. The embodiments, however, are not limited to implementation by the computing system 802.

As shown in FIG. 8, the computing system 802 comprises a processor 804, a system memory 806 and a system bus 808. The processor 804 can be any of various commercially available computer processors or computer process circuitry, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi processor architectures may also be employed as the processor 804. The processor 804 may be configured by associated memory instructions contained in the system memory 806, such that when the instructions re executed on the processor (e.g. processor circuitry) 804, the processor may carry out one or more operations associated with any one of FIG. 5-FIG. 7B and/or any other operation or technique as disclosed herein.

The system bus 808 provides an interface for system components including, but not limited to, the system memory 806 to the processor 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computing system 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies. The computing system 802 is generally is configured to implement all logic, systems, methods, apparatuses, and functionality described herein with reference to FIGS. 1-7.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In various embodiments, the one or more application programs 832, other program modules 834, and program data 836 can include, for example, the various applications and/or components of the system 100, e.g., the operating system 112, account application 113, authentication application 114, other applications 115, access application 116, and the management application 123.

A user can enter commands and information into the computing system 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computing system 802. In addition to the monitor 844, a computer typically includes other peripheral output devices, such as speakers, printers, and so forth.

The computing system 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computing system 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet. In embodiments, the network 130 of FIG. 1 is one or more of the LAN 852 and the WAN 854.

When used in a LAN networking environment, the computing system 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computing system 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computing system 802, or portions thereof, can be stored in the remote memory/storage device 850. It will be appreciated that the network connections shown are exemplary and other means of establishing a communications link between the computers can be used.

The computing system 802 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least various embodiments may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Various embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

What is claimed is:

1. A method comprising:
   receiving, by an application executing on a processor, an application transaction counter (ATC), a digital signature, and a public key from a contactless card;
   verifying, by the application, the digital signature based on the public key;
   receiving, by the application, a request comprising a non-payment event;
   transmitting, by the application, a message comprising the request and a cryptogram to an authentication server, wherein the cryptogram is based at least in part on the ATC and a key associated with the card;
   receiving, by the application, a response from the authentication server verifying the cryptogram, wherein the response is based on the payment protocol and conforms to the payment format, wherein the response reflects the performance of the non-payment event, wherein the authentication server authorizes the non-payment event using the payment protocol based at least in part on the indication to request authorization of the non-payment event using the payment protocol;
   receiving, by the application, an ATC of the authentication server and determining a difference between the ATC of the authentication server and the ATC of the contactless card;
   responsive to the difference indicating the ATC of the authentication server and the ATC of the contactless card are out of synch by an amount greater than zero but less than a first threshold, incrementing, by the application, the ATC of the contactless card based on the verification of the cryptogram; and
   responsive to the difference being equal to or greater than the first threshold, synchronizing, by the application, the updated ATC of the contactless card with the ATC of the authentication server.

2. The method of claim 1, wherein the non-payment event comprises one or more of: (i) activating the contactless card, (ii) modifying a personal identification number (PIN) of the contactless card, or (iii) modifying an address associated with the contactless card.

3. The method of claim 2, wherein the response from the authentication server reflects one or more of: (i) the activation of the contactless card, (ii) the modification of the PIN of the contactless card, or (iii) the modification of the address associated with the contactless card.

4. The method of claim 1, wherein the ATC, the digital signature, and the public key are received using near field communication (NFC).

5. The method of claim 1, wherein the cryptogram is generated by one of the contactless card or the application, wherein the ATC is updated by incrementing the ATC by a predefined value associated with the card.

6. The method of claim 5, wherein the generation of the cryptogram is based on the payment protocol, wherein the cryptogram is an authorization request cryptogram (ARQC).

7. The method of claim 1, wherein the message includes a predefined transaction value to mimic the payment protocol to verify contactless card perform the non-payment event without completing a payment, wherein the payment protocol comprises the Europay, Mastercard, and Visa (EMV) protocol.

8. A non-transitory computer-readable storage medium, the computer-readable storage medium including instructions that when executed by a processor, cause the processor to:
   receive, by an application, an application transaction counter (ATC), a digital signature, and a public key from a contactless card;
   verify, by the application, the digital signature based on the public key;
   receive, by the application, a request comprising a non-payment event;
   transmit, by the application, a message comprising the request and a cryptogram to an authentication server, wherein the cryptogram is based at least in part on the ATC and a key associated with the card;
   receive, by the application, a response from the authentication server verifying the cryptogram, wherein the response is based on the payment protocol and conforms to the payment format, wherein the response reflects the performance of the non-payment event, wherein the authentication server authorizes the non-payment event using the payment protocol based at least in part on the indication to request authorization of the non-payment event using the payment protocol;
   receive, by the application, an ATC of the authentication server and determine a difference between the ATC of the authentication server and the ATC of the contactless card;
   responsive to the difference indicating the ATC of the authentication server and the ATC of the contactless card are out of synch by an amount greater than zero but less than a first threshold, increment, by the application, the ATC of the contactless card based on the verification of the cryptogram; and
   responsive to the difference being equal to or greater than the first threshold, synchronize, by the application, the updated ATC of the contactless card with the ATC of the authentication server.

9. The computer-readable storage medium of claim 8, wherein the non-payment event comprises one or more of: (i) activating the contactless card, (ii) modifying a personal identification number (PIN) of the contactless card, or (iii) modifying an address associated with the contactless card.

10. The computer-readable storage medium of claim 9, wherein the response from the authentication server reflects one or more of: (i) the activation of the contactless card, (ii) the modification of the PIN of the contactless card, or (iii) the modification of the address associated with the contactless card.

11. The computer-readable storage medium of claim 8, wherein the ATC, the digital signature, and the public key are received using near field communication (NFC).

12. The computer-readable storage medium of claim 8, wherein the cryptogram is generated by one of the contactless card or the application, wherein the ATC is updated by incrementing the ATC by a predefined value associated with the card.

13. The computer-readable storage medium of claim 12, wherein the generation of the cryptogram is based on the payment protocol, wherein the cryptogram is an authorization request cryptogram (ARQC).

14. The computer-readable storage medium of claim 8, wherein the message includes a predefined transaction value to mimic the payment protocol to verify contactless card perform the non-payment event without completing a payment, wherein the payment protocol comprises the Europay, Mastercard, and Visa (EMV) protocol.

\* \* \* \* \*